(12) United States Patent
Nakanishi et al.

(10) Patent No.: US 6,374,021 B1
(45) Date of Patent: Apr. 16, 2002

(54) LIGHT TRANSMITTING/RECEIVING MODULE

(75) Inventors: Hiromi Nakanishi; Yoshiki Kuhara, both of Osaka (JP)

(73) Assignees: Sumitomo Electric Industries, Ltd., Osaka (JP); NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 09/503,449

(22) Filed: Feb. 14, 2000

(30) Foreign Application Priority Data

Feb. 17, 1999 (JP) .............................. 11-038672

(51) Int. Cl.[7] .............................. G02B 6/30; G02B 6/42
(52) U.S. Cl. .............................. 385/49; 385/88
(58) Field of Search .............................. 385/49, 88, 89, 385/92, 14

(56) References Cited

U.S. PATENT DOCUMENTS

| | | | |
|---|---|---|---|
| 4,750,799 A | * | 6/1988 | Kawachi et al. |
| 4,904,036 A | * | 2/1990 | Blonder et al. |
| 4,969,712 A | * | 11/1990 | Westwood et al. |
| 5,696,862 A | * | 12/1997 | Hauer et al. .................. 385/88 |
| 5,787,215 A | * | 7/1998 | Kuhara et al. ................ 385/88 |
| 5,854,867 A | * | 12/1998 | Lee et al. ..................... 385/49 |
| 6,027,255 A | * | 2/2000 | Joo et al. ...................... 385/88 |

OTHER PUBLICATIONS

Uno et al., Novel 1.3/1.55 MUM "Dual–Wavelength Receiver Having Embedded Fiber Circuit for Optical Subscriber Systems", Optical Fiber Communication, New York, IEEE, vol. Cong. 19, 1996, pp. 54–55, XP000620991. (no month available).

Ogusu et al., "Receptacle Type Bi–directional WDM Module I", Electronics Society Conference of Japanese Electronics, Information and Communication, C–208 (1996). (no month available).

T. Uno et al., "Hybridly Integrated LD/PD Module With Passive–Alignment Technology", Electronics Society Conference of Japanese Electronics, Information and Communication C–3–89 1997 (no month).

Uchida et al., "Low–Cost Hybrid WDM Module Consisting of a Spotsize Converter Integrated Laser Diode and a Waveguide Photodiode on a PLC Platform for Access Network Systems", IEICE Trans Electron, vol. E80–C–, No. 1, Jan. 1997.

* cited by examiner

Primary Examiner—Rodney Bovernick
Assistant Examiner—Michael J. Stahl
(74) Attorney, Agent, or Firm—Smith, Gambrell & Russell, LLP

(57) ABSTRACT

The PD/LD module of the present invention comprises a platform, a straight light guide (waveguide) formed on the platform for guiding transmitting light and receiving light, a light source (LD or LED) positioned at an end of the light guide for emitting transmitting light, a PD mounted just above the light guide for detecting receiving signals and a filter sloping upward on the way of the light guide for reflecting receiving light to the photodiode (PD) and passing transmitting light.

14 Claims, 16 Drawing Sheets

LIGHT TRANSMITTING/RECEIVING MODULE

BACKGROUND OF THE INVENTION

1. Field of the Invention

This invention relates to a light transmitting/receiving module, eg., to an LD/PD (Laser Diode/Photodiode) module, an LD/APD (Laser Diode/Avalanche Photodiode) module, an LED/PD (Light Emitting Diode/Photodiode) module or an LED/APD (Light Emitting Diode/Avalanche Photodiode) module unifying a light transmitting device and a light receiving device which are used at base ports (broadcasting station) and subscribers in a unidirectional or bidirectional optical communication system capable of transmitting optical signals with different wavelengths in a unidirectional or bidirectional manner, and more particularly, relates to an LD/PD or an LED/PD module enjoying a simple structure, easy production method, high reliability, and low cost.

2. Description of Related Art

This application claims the priority of Japanese Patent Application No. 11-38672 (38672/1999) filed Feb. 17, 1999 which is incorporated herein by reference.

[Explanation of Bidirectional Optical Communication]

Recent development of technology has been striving to reduce the transmission loss of optical fibers and has been enhancing the properties of semiconductor laser diodes (indicated as LDs hereafter) and semiconductor photodiodes (indicated as PDs hereafter).

The light emitting devices used in the optical communication system include LDs and LEDs, but in this invention an LD (laser diode) is picked as a light emitting device. Further, the light receiving devices includes PDs and APDs, but this invention picks a PD (photodiode) as a light receiving device. This invention can include both the LD and the PD. There exist telephones, facsimiles, televisions and so on as means for transmitting information. Particularly, people have rigorously tried optical communication utilizing long wavelength light, for example, the light with a 1.3 μm wavelength or the light with a 1.55 μm wavelength. Recently, there develops a bidirectional transmission system capable of transmitting and receiving signals in forward and backward directions at the same time by only a single optical fiber. Such a communication system is called a "bidirectional communication system". Single optical fiber is one of the most beneficial advantages.

FIG. 1 schematically shows a multiwavelength bidirectional optical communication system which adopts a plurality of wavelengths for transmitting signals simultaneously both in a forward direction and in a backward direction. One station is connected to a plurality of subscribers (ONUs) by optical fibers. Although FIG. 1 shows only a single subscriber for simplicity, many subscriber ports are connected to the central station. The fiber from the station branches through many bisecting points into a plurality of fibers linking with individual subscribers.

The central station amplifies the signals of telephones or televisions as digital signals or analog signals, and drives a semiconductor laser (LD1) which produces $\lambda_1$ light responsive to the amplified signals. The light of $\lambda_1$ emitted from the LD1 enters an optical fiber 1 as light signal of $\lambda_1$. A wavelength division multiplexer (WDM) 2 introduces the $\lambda_1$ light into an intermediate optical fiber 3. Another wavelength multiplexer (WDM) 4 allocated to the subscriber side leads the $\lambda_1$ light to an optical fiber 5, and the $\lambda_1$ light is received by a photodiode (PD2) capable of converting the optical signals to electric signals. A receiver apparatus on the subscriber side amplifies and processes the electric signals for reproducing the voice of telephone or the image of television. The signals flowing from the station to the subscribers are called "downward signals", and the direction is called a "downward direction".

On the contrary, the subscriber converts electric signals of facsimile or telephone into $\lambda_2$ light signals by a semiconductor laser diode (LD2). The $\lambda_2$ light enters an optical fiber 6, is introduced to an intermediate optical fiber 3 by the WDM 4, and enters the PD1 capable of converting the $\lambda_2$ signals to electric signals, passing through the WDM 2. These electric signals are dealt with by converters or signal processing circuits on the station side. The signals flowing from the subscribers to the station are called "upward signals", and the direction of the signals is called an "upward direction".

The above system appropriates $\lambda_1$ to the downward signals, and $\lambda_2$ to the upward signals exclusively. In practice, light with the same wavelength may be used for both the upward and downward signals. Another system allocates two wavelengths $\lambda_1$ and $\lambda_2$ to both the upward signals and the downward signals. In this case, the separation of two wavelengths is an extremely important problem in the optical communication system capable of carrying two different wavelength signals in an optical fiber. [Explanation of Wavelength Division Multiplexer]

When the bidirectional communication (two-way communication) using two sorts of light with different wavelengths is carried out by only one optical fiber, both the station and the subscribers require a device for discriminating and separating the wavelengths. The WDMs 2 and 4 play the role of distinguishing and separating different wavelengths. The WDMs has the function of connecting the $\lambda_1$ light to the $\lambda_2$ light for leading both lights into a fiber, and the function of extracting only one wavelength light from two sorts of wavelength light propagating in the fiber. Therefore, the WDMs perform an important part in the multiwavelength bidirectional communication systems.

Various types of wavelength division multiplexers have been proposed, which will be explained by FIG. 2 and FIG. 3. FIG. 2 indicates a WDM consisting of optical fibers or optical waveguides. Two optical paths 8 and 9 are close to each other at a part 10 for exchanging the energy of light therebetween. Various coupling modes are realized by determining the distance D and the length L of the close part 10. For example, when $\lambda_1$ enters the optical path 8, the light with $\lambda_1$ wavelength appears in a path 11. When $\lambda_2$ enters an optical path 12, the light with $\lambda_2$ wavelength appears in the optical path 9 instead of the path 8.

FIG. 3 shows another WDM that uses a multilayered mirror. This WDM consists of two rectangular isosceles triangle columns (glass blocks) 13 and 14 and a dielectric multilayer mirror 15 formed on the slanting plate of the columns. It is possible to make the whole of $\lambda_1$ light pass through the dielectric multilayer mirror and to make the whole of $\lambda_2$ light reflect from the dielectric multilayer mirror by an appropriate combination of the refractive index and the thickness. The dielectric multilayer allows the incident light at 45 degrees to pass through or reflect. This dielectric layer type WDM can be utilized for the WDMs 2 and 4 in the optical communication system of FIG. 1. The WDM is sometimes called a "wave-division-integration device" or "wavelength division multiplexer". Fiber-type WDMs and glass block type WDMs have already been on sale.

An example of an LD/PD module on the subscriber side is explained by referring to FIG. 4. A single mode optical fiber 16 leading from the center station to the subscriber side is connected to an optical fiber 18 of a subscriber (ONU) module by an optical connector 17. The ONU module has a fiber-type WDM 21 which couples the fiber 18 to a fiber 19 with wavelength-selectivity An optical connector 22 couples the optical fiber 18 to an LD module 25 in the ONU. Another optical connector 23 joins the fiber 19 to a PD module 27.

The light signals transmitted from the LD 25 via the optical fibers 24 and 18 are upward system. 1.3 μm light carries signals from the subscriber side to the station through the upward system. The signals transmitted from the fibers 19 and 26 to the PD module 27 are downward system. 1.55 μm light carried from the station is converted to electric signals by the PD module 27. The LD module 25, which is a signal transmitting device, includes an electric circuit for amplifying and modulating the signals of telephones and facsimiles, and a laser diode (LD) for converting electric signals into optical ones. The PD module 27, which is a receiving device, contains a photodiode for converting optical signals from the station into electric signals, an amplification circuit for amplifying the optical signals and a demodulation circuit for restoring the television signals or telephone signals. The WDM 21 has the function of separating the 1.55 μm light from the 1.3 μm light. This example allots the 1.3 μm light to the upward system and the 1.55 μm light to the downward system.

This invention provides an improved LD/PD module for bidirectional multiwavelength optical communication. The LD/PD module contains a light emitting device, a light receiving device, circuits around these devices, and so on. Related art will be explained on every device.

[Explanation of Conventional Semiconductor Laser Diode (FIG. 5)]

FIG. 5 shows a conventional laser diode device 25, which includes a semiconductor laser diode (LD) chip 29 and a monitoring photodiode (PD) chip 30. The laser diode chip 29 is vertically mounted on a side surface of a protrusion part (pole) 31 on a header 32. The light emitted from the laser diode chip 29 is in parallel to the chip surface. The photodiode chip 30 is mounted on the top surface of the header 32 at a spot where the backward light emitted from the laser diode chip 29 attains. A plurality of lead pins 33 are implanted on the bottom of the header 32. A cap 34 covers the top surface of the header 32.

The cap has a window 35 at the center. The light beams emitted from the laser diode 29 go out in both upward and downward directions. There is a lens 37 fixed just above the window 35 and supported by a lens holder 36. A conical housing 38 covers the top of the lens holder 36. A ferrule 39 is fixed to the top part of the housing 38. The ferrule 39 holds an end of an optical fiber 40. The ends of the ferrule 39 and the fiber 40 are polished at a slanting angle of about 8 degrees so as to prevent reflected light from going back to the laser. The holder 36 is aligned at an optimum spot to the header 32 by sliding the holder 36 and measuring the light power from the semiconductor laser at the other end of the fiber 40. Wires connect the pads of the laser diode chip 29 and the photodiode chip 30 with the lead pins 33, respectively.

The lens 37 converges the light beams emitted from the laser 29 on the end of the fiber 40. Since the laser is modulated by a driver circuit with an electric signal, the light carries the signal. The output of the laser diode is monitored by the monitoring photodiode 30. The material of the laser determines an oscillation wavelength ranging from 1.3 μm to 1.55 μm.

[Explanation of Conventional Photodiode Module (FIG. 6)]

FIG. 6 shows an example of a conventional photodiode module. A photodiode chip 41 is die-bonded on the upper surface of a header 42. There are lead pins 43 on the bottom surface of the header 42. A cap 44 covers the top surface of the header 42. An opening 45 is perforated at the center of the cap 44. A cylindrical lens holder 46 encircles the cap 44 upon the header 42, and supports a lens 47.

The lens holder 46 has a conical housing 48 on the top. A ferrule 49 grips an end of an optical fiber 50. The housing 48 holds the ferrule 49. The ends of the ferrule 49 and the optical fiber 50 are slantingly polished for suppressing reflected light from going back to the laser diode.

The holder 46, the housing 48 and the ferrule 49 are aligned at optimum spots by penetrating light to the fiber and measuring the light power from the photodiode chip 41. The material of the light receiving layer of the photodiode 41 determines the range of a wavelength of light detectable to the photodiode device. A silicon (Si) photodiode is available for sensing visible light. Such a Si photodiode is, however, irrelevant for the present invention which aims at an LD/PD module intended for infrared light. Sensing of infrared light needs a semiconductor photodiode having an InP substrate enjoying a narrow band gap and an InGaAs or an InGaAsP light receiving layer enjoying a narrow band gap for absorbing infrared light.

[Problems to be Solved]

Problems of the conventional LD/PD modules will be pointed out. Subscribers would be mostly households. Thus, the optical bidirectional communication network would acquire a great market as well as telephones being in common use now. However, consumers would not buy such an LD/PD module for optical communication unless the LD/PD module should be dropped in price as low as telephones. Since the conventional LD/PD module shown by FIG. 4 assembles the LD module, the PD module and the WDM module, it cannot be made as inexpensively as telephones. The price is the sum of the costs of modules.

Such an expensive LD/PD is an obstacle to one's progress among subscribers. The technology of producing a low-price LD/PD is indispensable to further development of the optical bidirectional communication system. Several attempts have been practiced to produce devices enjoying a few components, compact size and low price. Some proposals for lowering the cost are now explained.

[A. Spatial Separating Beam Type Module (a Receptacle Containing a WDM, a PD and an LD)]

This paper was proposed by Masahiro Ogusu, Tazuko Tomioka and Sigeru Ohshima, "Receptacle Type Bi-directional WDM Module I", Electronics Society Conference of Japanese Electronics, Information and Communication, C-208, p208 (1996), which is shown by FIG. 7. A WDM filter 61 is centrally positioned at a slanting degree of 45 degrees in a housing 60. Three drum lenses 62, 63 and 64 are fixed on three sides of the housing 60, respectively. A photodiode (PD) 66 is mounted on one side in front of the drum lens 62. A laser diode (LD) 68 is fixed on another side in front of the lens 63. The lens 64 lies at the end connecting to an optical fiber 69.

In practice, the module consists of two separative parts. One part having the fiber end can be attached to or removed from the other part. In this case, the housing 60 and a receptacle fixing the optical fiber 69 can be easily attached or removed. The optical fiber 69 can easily be inserted to or pulled out from the housing 60. In the coupled state, an external fiber 69 is connected via the WDM 61 to the PD 66 and the LD 68. The light emitted from the optical fiber 69 is spatially expanding in the receptacle. Therefore, the lenses 62, 63 and 64 prevent the light from the fiber 69 from diverging spatially in the receptacle. The LD 68 emits 1.3 μm light which penetrates the WDM filter 61 slantingly and enters the fiber 69 for sensing optical signals.

The incoming light propagating in the fiber 69 is 1.55 μm light which is reflected by the WDM 61 and is transmitted to the PD 66 passing through the lens 62. The WDM filter 61 has the property of selecting wavelengths. This module is smaller size than the module shown by FIG. 4, but still includes two independent devices, e.g., the LD and the PD, and the indispensable WDM filter requiring three focusing lenses. The alignment of parts is still as difficult as the conventional module of FIG. 4. The cost is mostly the same a s the module of FIG. 4.

[B. Y-bisecting Wave Guide Type Module (FIG. 8)]

This is proposed by Naoto Uchida, Yasufumi Yamada, Yoshinori Hibino, Yasuhiro Suzuki & Noboru Ishihara, "Low-Cost Hybrid WDM Module Consisting of a Spot-Size Converter Integrated Laser Diode and a Waveguide Photodiode on a PLD Platform for Access Network Systems", IEICE TRANS. ELECTRON., VOL.E80-C, No. 1, p88, January 1997, which is explained by referring to FIG. 8. An insulating silicon substrate 70 is adopted as a base. A transparent quartz glass optical waveguide 71 is formed on the insulating silicon substrate 70. A corner of the waveguide 71 is cut to be a step part 72. Doping of impurity makes narrow Y-bisectional paths 73, 74, 76, 77 and 78 on the optical waveguide 71.

This module has two Y-branches. The first Y-branch has a WDM filter 75 at the cross point. The WDM 75 has the function of selecting wavelengths, that is, it can reflect 1.55 μm light and penetrate 1.3 μm light. Electrode patterns 79, 80, 81 and 82 are evaporated on the step 72 of the waveguide. An LED in this case, Edge-emitting LED (E-LED) or LD 83 having an electrode on its bottom surface is bonded on the electrode patterns 79 and 80. This is either an LED or an LD 83 capable of emitting 1.3 μm light from an emitting point on an end surface.

A PD 84, which is capable of sensing 1.3 μm light emitted from the end surface, is bonded on the farther electrodes 81 and 82 on the step 72. Since this module has the electrodes on the bottom surface, wire-bondings are unnecessary. This PD is novel in the type of receiving light from the end surface, but is difficult to produce due to its novelty. The PDs popularly sold on the market are not fitted to the module because of their upper surface light sensing types. The light spreading in the optical fiber 88 contains both 1.3 μm light and 1.55 μm light. The light goes into the path 74, and attains to the WDM 75 which reflects the 1.55 μm light to another optical fiber 87. The 1.3 μm light further goes ahead and enters both the Y-branched paths (waveguides) 77 and 78. The light attaining to the LED or the LD 83 is useless light. The light going to the PD 84 is detected as receiving signal light. The LED or the LD 83 makes transmitting signal light of 1.3 μm which propagates in the path 78, the WDM 75 and the path 74, and enters the optical fiber 88 by converging the light with a focus lens (not shown).

This example uses the WDM only for excluding the 1.55 μm light. The worst drawback of the proposed module is the difficulty of producing the planar Y-branched waveguides. The fabrication of curved Y-branch on a quartz glass waveguide layer is far more difficult than that of a straight path on a waveguide. Further, the alignment between the lens and optical fiber is difficult, because the signal light once going out to the free space must be converged into the end of the optical fiber by the focus lens. The part costs, e.g., lens and so on, increase the module price. There exists the possibility of coupling the fibers directly with the ends of the paths 73 and 74. Such a junction also requires a difficult alignment among the fibers and paths. Thus, this proposal cannot satisfy the requirement of producing an inexpensive LD/PD module.

[C. Upward Reflection WDM Type LD/PD Module (FIG. 9)]

This is proposed by Tomoaki Uno, Tohru Nishikawa, Masahiro Mitsuda, Genji Tohmon, Yasushi Matsui, "Hybridly integrated LD/PD module with passive-alignment technology", 1997 Conference of Electron, Information, Communication Society, C-3-89 p198 (1997), which is explained by referring to FIG. 9. This proposal strives to satisfy the miniaturization and the enhancement by mounting an LD and a PD on a common substrate. In FIG. 9, a V-groove 91 is formed on a silicon substrate 90 by scribing the substrate with a straight line. An end of an optical fiber 92 is inserted, and is fixed in the V-groove 91. A deep slanting notch 93 is dug on the way of the optical path as being across the fiber 92 and the V-groove 91 and getting in the Si substrate 90. A fiber end 94 is cut and separated from the fiber 92 by the notch 93. The slanting notch 93 holds a WDM filter 95 in it. A PD 96 is mounted just before the slanting WDM filter 95 above the V-groove 91 formed on the top of the Si substrate 90. A step part 97 is made by cutting the back end of the Si substrate 90. An LD chip 98 lies upon the step part 97. The LD 98 emits 1.3 μmm light 99 for transmitting signals. The transmitting light 99 propagates in the fiber 92, passes through the WDM 95 and reaches the station (not shown). The receiving light 100 of 1.55 μm running in the fiber 92 is reflected from the WDM 95 to be light 101 and sensed by the PD 96. The light path turns upward at the branch.

The module of FIG. 9 seems to have a simple structure, but it is difficult to bury the fiber into the V-groove and to align the LD and the PD with the fiber by sliding the LD and the PD and monitoring the light power sensed by the PD. A single-mode fiber has a core diameter of 10 μm and a cladding diameter of 125 μm. Insertion of the WDM 95 requires the notch to cut the thick cladding. Thus, the reflection loss between the fiber 94 and the fiber 92 increases because of a wide gap between two fibers separated by the WDM at the notch 93. The V-groove becomes so deep that the distance between the WDM 95 and the PD 96 is prolonged. The expansion of light reduces the sensitivity. Further, the light emitted from the LD 98 leaks at the gap, which results in reducing the light entering the optical fiber 92. Hence, the light loss increases.

SUMMARY OF THE INVENTION

An LD/PD module of the present invention includes a platform (substrate), a light guide straightly formed at the center of the platform for leading light, a filter laid on the light guide for reflecting a portion of the light and for penetrating another portion of the light, a photodiode mounted on the platform for detecting the light reflected from the filter, and a light emitting source (LD or LED) mounted on the platform at the back of the light guide for generating transmitting-light. Further, there are two forms A and B in the coupling structure between a fiber and the module.

In the form A, a V-groove formed in the platform fixes the optical fiber. A fiber end is unified to the LD/PD module, which is called a "pig-tail" type. The receiving light from the optical fiber moves forward in the light guide (optical waveguide), and is reflected upward from the filter. The reflected light is detected by the photodiode.

In the form B, an optical fiber is connected to an optical connector by inserting guide pins into the optical connector. The optical fiber faces to an optical waveguide of the LD/PD module, as holding the alignment therebetween. This is a receptacle type. The receiving light propagating in the optical fiber of the optical connector advances in the light guide, and is reflected upward by the filter. The reflected light is sensed by the photodiode (PD). The transmitting light generated in the light emitting source (LD or LED) enters the optical waveguide, passes through the filter and goes into the fiber.

The LD/PD module of the present invention differs from the LD/PD module shown by FIG. 9 in which the optical fiber with a diameter of 125 μm is sunk in the V-groove. In this LD/PD module, the light guide can be formed in a shallow surface of the platform so that the reflected light from the filter can go into the PD without spreading over. Hence, the loss of receiving light is small. In the case of fixing the optical fiber in the V-groove, the alignment between the LD and the light guide requires a lot of time and the depth error of the V-groove causes the fluctuation of fiber height. The module of the present invention makes it easy to couple the LD with the light guide endowed with no fluctuation of height. The light guide is a straight waveguide produced by enhancing partially refractive index by doping an impurity to a transparent material of the platform. The light guide is not a fiber glued on the platform but a waveguide formed in the platform by impurity doping. Therefore, it is possible to make the waveguide so shallow. An ordinary waveguide gluing a fiber on the platform requires a depth of more than a half of the diameter of the fiber.

The waveguide on the platform can be made from a transparent inorganic glass material or a transparent plastic material. Quartz glass ($SiO_2$) is the best material for the waveguide. The quartz glass having a low refractive index, e.g., n is about 1.45, which is partially increased by doping Ge and so on. This light guide requires no complex process of producing such a double Y-branch that is shown by FIG. 8, because it is a straight waveguide. When the substrate uses quartz glass, it is enough to allot quartz glass ($SiO_2$) to a part of the substrate, for example, the upper surface of the Si substrate is oxidized to form a $SiO_2$ surface, or a quartz glass waveguide is formed by spattering $SiO_2$ to the surface of the Si substrate.

The LD/PD module of the present invention is applicable to the two-wavelength system using different wavelengths $\lambda_1$ and $\lambda_2$ for transmitting signals and receiving signals. This two-wavelength system establishes simultaneous bidirectional transmission. In the system, the filter has two roles of reflecting almost all of $\lambda_1$ light and of allowing almost all of $\lambda_2$ light to pass through. Hence, the filter is a WDM one.

Further, the LD/PD module of the present invention can also use a single wavelength λ as transmitting and receiving signals. In the single-wavelength system, the filter reflects a part of λ light and allows the other part of λ light to pass through at a definite rate.

Since the filter can determine an index of the reflection penetration to constant-wavelength light, the filter can be produced by piling a plurality of dielectric films of different refractive indexes in turn For example, a filter is made by piling a plurality of dielectric films with different thicknesses and different refractive indexes on a glass substrate in turn, or piling a plurality of dielectric films on a transparent polymer material.

The LD/PD module can use an InP substrate and an InGaAs light receiving layer or an InGaAsP light receiving layer as a photodiode. In this case, signal light can use light near infrared light of 1.3 μm, 1.55 μm and so on. The module uses an LD of, e.g., an InGaAsP type laser.

Otherwise, a Si-PD can be used as a photodiode. In the case of the Si-PD, signal light should be visible light with a wavelength between 0.7 μm and 0.8 μm, and a GaAlAs laser can be used as a light source. Both top surface incident-type PDs and bottom surface incident-type PDs can be applicable. Additional mounting of an amplifier capable of amplifying a photocurrent of the PD raises sensitivity, because the amplifier helps the PD to detect weak signals and helps suppressing external noises.

The case (B) is a receptacle-type that has a plurality of guide pins fixed on a platform for connecting the platform to an optical connector, which is explained. The case (B) features in the coupling capable of connecting an end of an optical fiber directly with a light guide. The guide pins work the alignment between the optical connector and the waveguide of the module. The pin diameter, the pin length and the interval between the pins are determined as the optical connector is fitted to the pins, for example, the connector is MT connector, mini-MT connector and so on.

The case (A) is a pig tail-type that has a V-groove formed by digging on a platform for fixing an end of the optical fiber directly to the V-groove, which is explained. There is no alignment between an optical connector and an waveguide.

(1) The first advantage of the present invention is simple in the structure of LD/PD module. The conventional module structure, as shown in FIG. 4, is complicated, large-scaled, and heavy, because individual devices, for example, the WDM module of FIG. 2 and FIG. 3, the LD module of FIG. 5, the PD module of FIG. 6 and so on, are connected to each other by the optical fiber. The module of FIG. 7 unifies the PD with the LD, but requires a large capacity for the light propagating in not the optical waveguide but the space. The light spreads over due to the space-propagating, so that the lens for converging the light is needed.

The prominence of the present invention is certified by comparing the conventional modules. The module of the present invention mounts the WDM, the PD and the LD totally on a sheet of substrate. All necessary devices (LD, PD, WDM and AMP) are mounted on the upper surface of the platform in both the practical mode 1 and mode 2. The structure is extremely simplified. The present invention needs no optical fiber or no optical connector for connecting the devices, for example, PD, LD, WDM and so on. The ratio of space occupied by an excessive case or package is so small that a small-sized and light module is produced. The reliability is high, because the devices are closely mounted. The module of the present invention is so cheap, which brings about a great power for expanding the optical communication widely in ordinary people.

(2) The AMP set up close to the PD can depress external noises.

(3) Both the transmitting light and the receiving light propagate through the same optical waveguide which is formed like a straight line on the substrate surface. The module of FIG. 8 has the optical waveguide formed on the substrate, but the optical waveguide is shaped like a curved line. Such a curved optical waveguide is difficult in producing. This invention enjoys an easy fabrication with a high yield. The PLC (Planar Lightwave Circuit) technology aims at high-performance and sophistication by allotting a WDM function and Y-branch functions to the PLCs in general. This invention does not take such a complicated way but adopts a simple, straight light guide formed on a platform, which alleviates the difficulty of fabrication.

(4) The receiving light propagating through the shallow optical waveguide shoots the slanting filter, turns upward, and goes into the PD. A short optical path prevents the spreading of beams, which reduces the loss of light power. The prior module of FIG. 9 inserts the WDM filter in the slanting upward direction into the optical path, reflects the receiving light upward and introduces the light into the PD. The module of FIG. 9 and the present invention seem to be similar in fabricating the upward filters, but actually there is a great deference therebetween.

In the module of FIG. 9, a thick fiber with a diameter of 125 μm is buried in the substrate surface, and a filter is inserted slantingly into a cross section of the optical fiber. The large filter can not be avoided. The optical path from the filter to the PD is long. The long optical path and no focusing lens aggravate the spreading of beams, which increases the loss of light power. As mentioned before, the shallow light guide shortens the optical path running from the filter to the PD and prevents the expansion of beams, which enables the reduction of light power loss. This is one of the most important advantages.

In the prior module of FIG. 9, the optical fiber must be completely buried in the V-groove. The optical fiber must be fixed in the deep V-groove with an adhesive. The width of the V-groove should be 250 μm to 300 μm in order to bury the optical fiber with a diameter of 125 μm perfectly into the groove. The V-groove is so deep that the filter slit must be deep enough to insert the wide filter. The PD is fixed on the substrate surface as stretching over the V-groove. There occur several troubles in the fixation of the PD, for example, the V-groove is too wide to allot a sufficient area for soldering the PD chip or the PD chip is too small to make the PD chip extend over the V-groove. For instance, when the V-groove has a width of 300 μm, even a 400 μm square PD takes only 50 μm margins for connecting in both sides. This is an insecure condition. If a large 600 μm square PD were used, the connecting margin would be 150 μm, which is too large to bond on the substrate surface. Furthermore, there occurs the problem that the transmitting signal light spreads over until the reflected light enters the PD and the incident light into the PD is greatly decreased.

The present invention forms a shallow optical waveguide on the substrate surface. The PD is easy to be fixed on the substrate due to no groove. A large-sized PD is unnecessary. The distance from the optical guide layer to the platform surface is about 5 μm to 40 μm. The optical path from the filter to the PD is short. The light-coupling with the PD is realized in a short space enough to prevent the beams from stretching over. The efficiency of coupling is high.

(5) This invention saves the process of fixing the fiber in the groove and the process of processing after the fixation. A narrow groove width of the filter is available. It is sufficient for the filter-groove to make a slanting, shallow slit in the substrate. A narrow filter width is enough to satisfy.

DETAILED DESCRIPTION OF THE PREFERRED EMBODIMENTS

[Practical Mode 1: Guide Pin-type (Receptacle-type) (B)]

An example of the present invention with respect to the guide-pin type LD/PD module will be explained by referring to FIG. 10. A Si-substrate is used as a platform 110 due to the sophisticated technologies, e.g., photolithography technology and so on. It is possible to use other materials, for example, a ceramic board, a polymer board, a metal board and so on. A light guide (optical waveguide) 114 is formed in the longitudinal direction (in the x-direction) on the Si-platform 110. A transparent $SiO_2$ film is formed on the Si substrate. A waveguide is formed by making a high refractive area on a part of the $SiO_2$ film. The production of waveguide straightly formed on the Si platform enjoys a high yield. The method of producing the waveguide has been disclosed, but the concept of the method is briefly explained hereafter.

Figure 1:
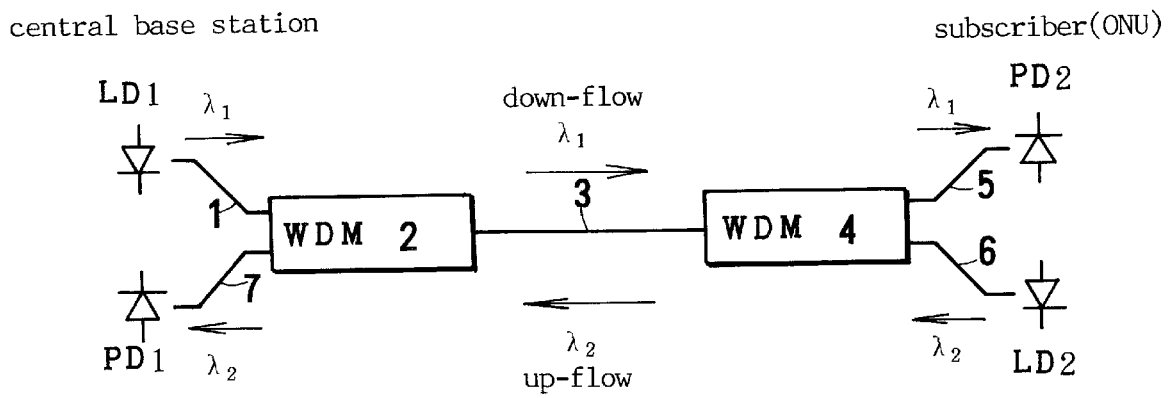
FIG. 1 is a schematic diagram of multiwavelength bidirectional optical communication system.
Figure 2:
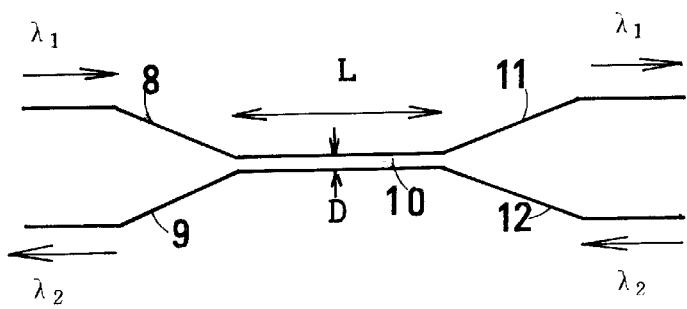
FIG. 2 is a schematic view of a WDM filter or an optical coupler making use of optical fibers or waveguides.
Figure 3:
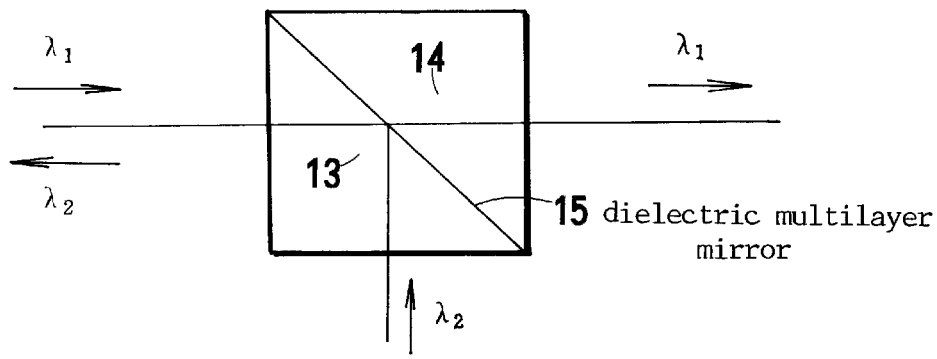
FIG. 3 is a schematic view of a WDM filter or an optical coupler in a rectangular column made by piling dielectric multilayers on a diagonal surface of a rectangular isosceles triangle column and gluing the triangle column to a partner column into a square column.
Figure 8:
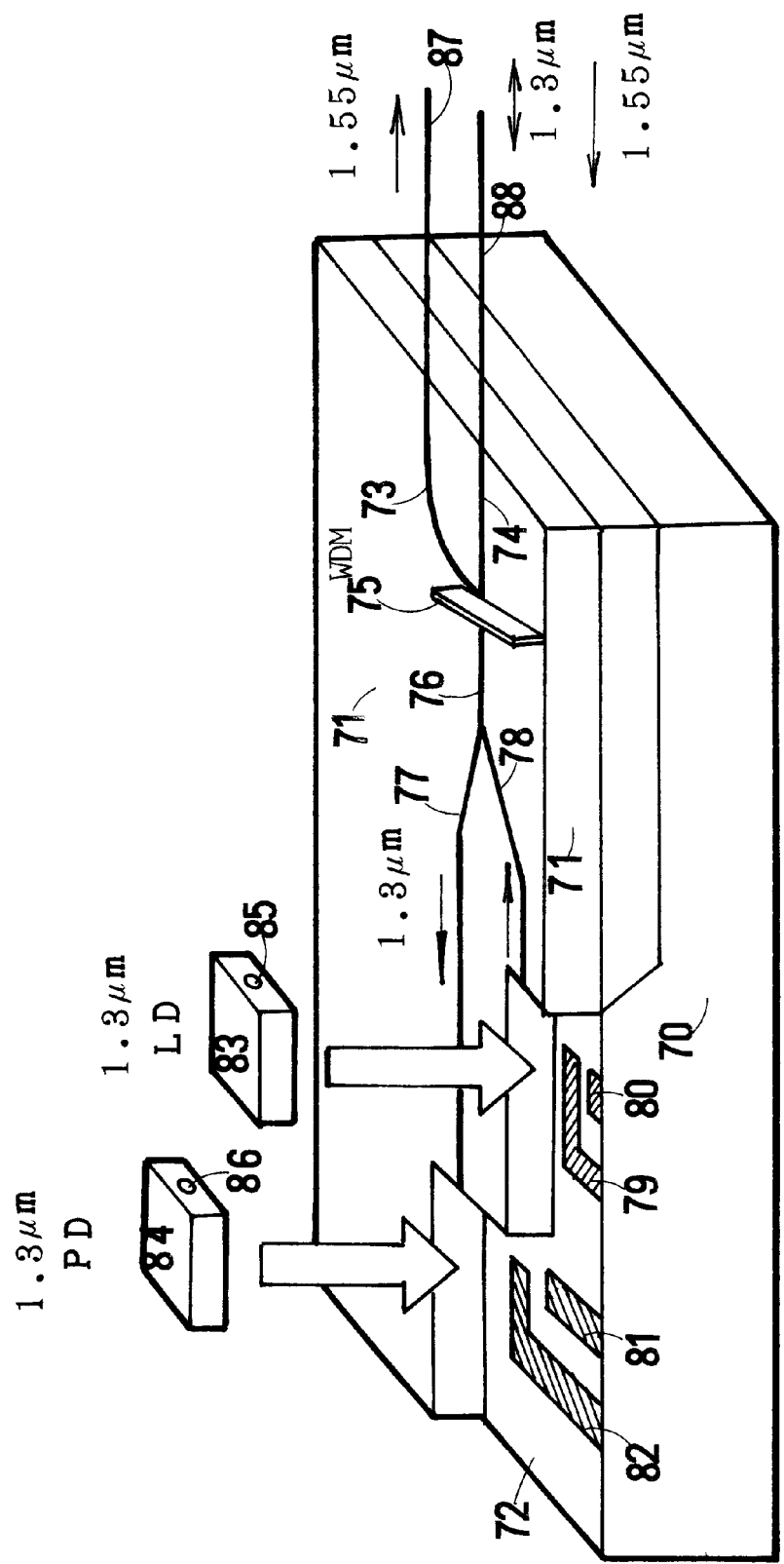
FIG. 8 is an oblique view of a prior Y-branch type multiwavelength LD/PD module.
Figure 10:
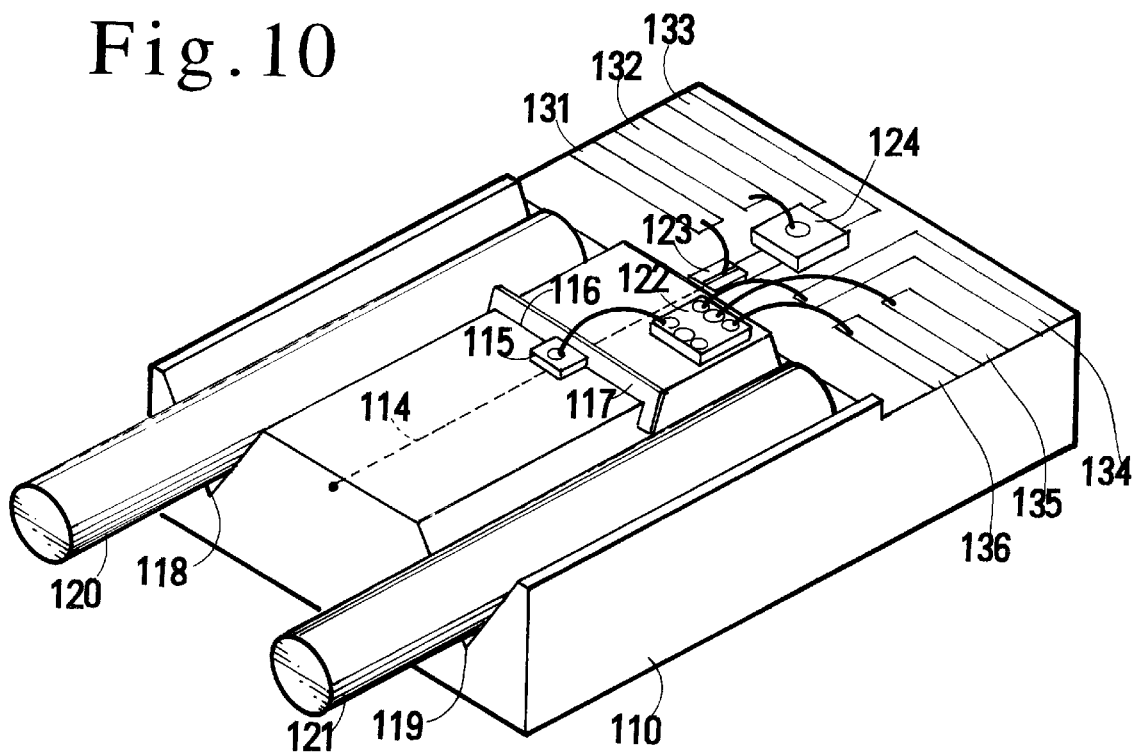
FIG. 10 is an oblique view of an embodiment LD/PD module related to the mode 1 of the present invention where the platform is attached to or removed from the optical connector by the guide pins.
Figure 11:
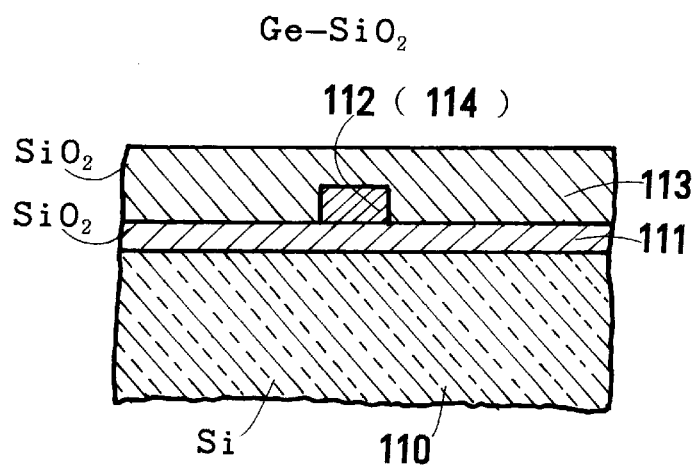
FIG. 11 is a sectional view of the platform having a light guide on the surface.

FIG. 11 is a partial sectional view of the light guide. A $SiO_2$ buffer layer 111 is formed on the Si substrate 110 by oxidizing the Si substrate or spattering $SiO_2$. Further, a germanium-doped high refractive index $SiO_2$ layer 112 is piled on the $SiO_2$ buffer layer 111 by the spattering method or the CVD method. The high refractive index $Ge-SiO_2$ layer 112 positioned in the center part remains by photo-etching with a mask having a pattern of central stripe, and further is covered with a low-refractive index $SiO_2$ cladding layer 113. The Ge-doped high refractive index $SiO_2$ layer 112 is assigned to be an optical waveguide, which is corresponding to the light guide 114 of FIG. 10. The light guide is higher than the surrounding in the refractive index, so that the light guide has the function of introducing light, i.e. light-guiding function. The light guide is formed near the upper surface of the platform. The depth from the waveguide to the platform surface is about 5 $\mu$m to about 40 $\mu$m. The distance is so short that light transmits in the waveguide quite close to the upper surface of the platform. This waveguide is straight unlike the Y-branch waveguides shown by FIG. 8, FIG. 4 and FIG. 2, which brings about easier production and a higher production yield.

The front part of the Si platform 110 is a little higher, and the rear part of the Si platform 110 is a little lower. The waveguide 114 is formed straightly in the center of the higher step part. An end of the waveguide (light guide) 114 is exposed to a front end of the Si substrate 110. The back end of the waveguide 114 is exposed to a side surface of the step part. A PD chip 115 for receiving light is fixed on a suitable region on the waveguide 114. A slanting groove 116 is formed just back of the PD chip 115. A filter 117 is inserted into the slanting groove 116. An inclination angle ($\theta$) of the filter 117 is in the range from 10 degrees to 50 degrees, for example, $\theta$=30 degrees. The filter is made of dielectric multilayers. The substrate is made of transparent glass or polymer materials. Two sorts of suitable dielectric layers with different refractive indexes and different thicknesses give the function of selecting the reflection transparency or wavelength. The receiving light advancing in the waveguide is reflected from the filter 117, goes upward and enters the PD 115. A suitable material for the PD is selected according to wavelengths of receiving light, for example, Si photodiode, InGaAs-type photodiode, InGaAsP-type photodiode and so on.

Two V-grooves 118 and 119 are bored in the longitudinal direction on the substrate 110 by a proper method, for example, cutting method, metal-mold shaping method, etching method and so on. The processing methods of grooves or steps are changed according to materials of the substrate. The substrate made of ceramic or plastic can be produced by molds, but the substrate made of metal can be produced by cutting or shaving. The Si-substrate is made by the etching method. A Si-anisotropic etching method will be briefly explained. A (001) plane of the Si-substrate is painted with a resist. The resist is masked and exposed, and rectangle holes are dug in the resist. The Si-substrate is etched by an etchant having anisotropy. Then, ($\pm 1 \pm 1\ 1$) planes are produced, which become V-grooves having slanting angles of 54.7 degrees and bottom angles of 70.6 degrees.

Figure 12:
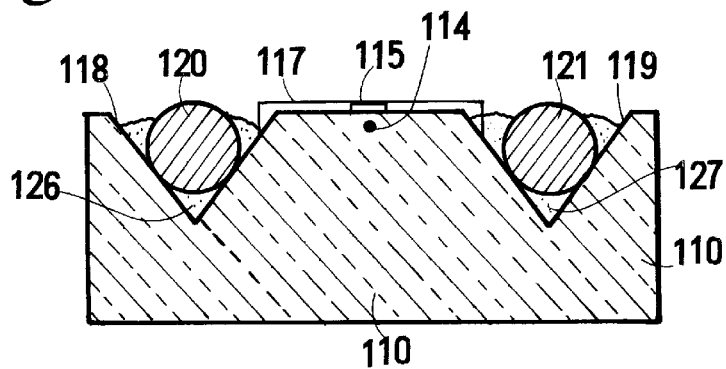
FIG. 12 is a longitudinal sectional view of the platform of the LD/PD module related to the mode 1 of the present invention.

The V-grooves 118 and 119 sustain guide pins 120 and 121. The guide pins are metal bars, plastic bars or ceramic bars. An adhesive fixes the guide pins 120 and 121 in the V-grooves 118 and 119. FIG. 12 shows a vertical sectional view of the platform. The adhesives 126 and 127 fix the guide pins 120 and 121 in the V-grooves 118 and 119. The number, the length, the diameter and the interval of the guide pins should be determined as fitting in the holes of an optical connector capable of attaching to and removing from the module. When the optical connector has three or four holes, the platform must have three or four guide pins in accordance with the holes of the optical connector.

It is very important to determine the relative positions between the guide pins 120 and 121 and the light guide 114. When the holes of the optical connector receive the guide pins 120 and 121, the optical fiber of the connector should be just opposite to the optical guide 114 in the longitudinal direction. It is preferable that the guide pins 120 and 121 are parallel with the optical guide 114, but non-parallel guide pins are also allowable, if the fiber coincides with the optical guide 114 in the joined state.

Figure 13:
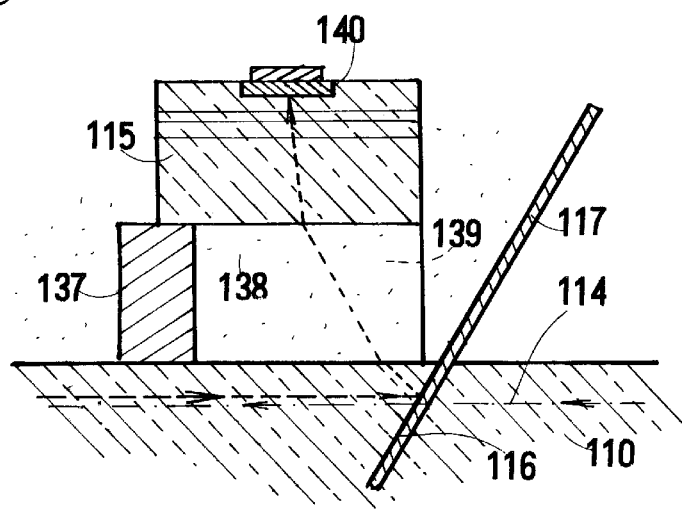
FIG. 13 is a partial enlarged longitudinal section including the receiving PD and the filter on the platform of the LD/PD module related to the mode 1 of the present invention.
Figure 14:
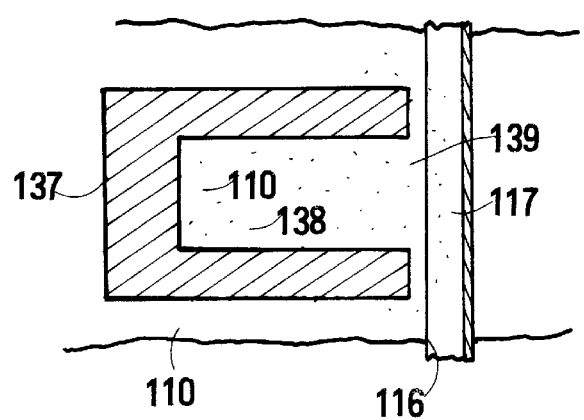
FIG. 14 is a partial horizontal plan view of the spacer and the filter for the PD on the platform of the LD/PD module related to the mode 1 of the present invention.

A pre-amplifier (AMP) 122 is fixed on the platform 110 for amplifying the signals transmitted from the PD 115. An electrode of the PD is connected to an input terminal of the AMP 122 by a wire. FIG. 13 is an enlarged sectional view in the vicinity of the PD 115. The receiving light propagating in the optical guide 114 is reflected from the filter 117, and the reflected light points to upward slanting direction and goes into the PD 115. When the reflected light enters the PD 115, a spacer 137 is sometimes necessary. The spacer 137 is a horseshoe-shaped fixture having a vacancy 138. The spacer 137 fixes the PD 115 on the upper surface. Since the filter 117 inclines at an angle of $\theta$ to the vertical, the reflected light becomes the beams inclined upward at an angle of $2\theta$ to the surface of the Si-platform. The receiving light beams are away from the waveguide, and go to the vacancy 138 filled with a transparent adhesive 139. The beams bend in the vacancy 138 of the spacer 137. The bending angle is determined by Snell's law. The beams advancing in the adhesives 139 reach the bottom surface of the PD 115. These reached beams are refracted into the PD 115, go ahead in the PD 115, and arrive at a light receiving part 140 of the PD. FIG. 14 shows a cross section of the spacer 137. As known from FIG. 13 and FIG. 14, the spacer 137 for lifting the PD 115 plays the important role of bending the beams up to the light receiving part 140 placed at the center of the PD 115. The refractive index of the adhesives 139 should be as same as that of the platform or should be a middle value between the platform refractive index and the PD refractive index, for example, n=3.5. It is also available for the adhesives 139 to have the same refractive index as the PD. The inclined angle of the filter, the height of the spacer and the length of the PD will be explained by referring to FIG. 27 hereafter.

Metallized patterns 131 to 136 are printed on the rear lower surface of the platform. An LD 123 is mounted on the lower surface at the rear end of the waveguide. A GaAlAs semiconductor laser or an InGaAsP semiconductor laser is available for the LD 123. LEDs are also useful as light emitting devices, especially edge-emitting LEDs. A PD 124 for monitoring is fitted to the rear of the LD 123. The monitoring PD 124 and the LD 123 are wire-bonded on the ground metallized patterns. Electrode pads of the AMP 122, the LD 123 and the monitoring PD 124 are connected to metallized electrodes by wires.

The LD 123 emits transmitting signal light in both front and back directions. The monitoring PD 124 monitors the intensity of light getting out backward. The light getting out forward enters the light guide 114, propagates through the light guide 114, and goes straight through the filter 117. The transmitting signal light enters the fiber of the optical connector (which is not shown in FIG. 10). The driving current of the LD 123 is supplied to the LD from the lead pins to the metallized electrodes.

Figure 4:
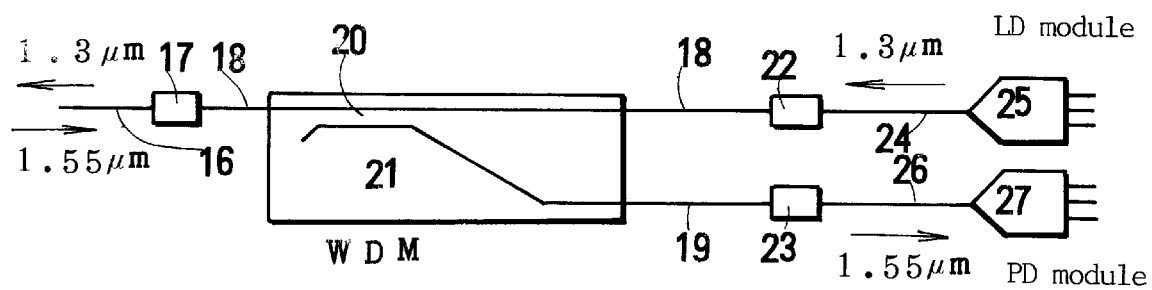
FIG. 4 is a structural figure of the conventional LD/PD module in the side of subscribers.
Figure 5:
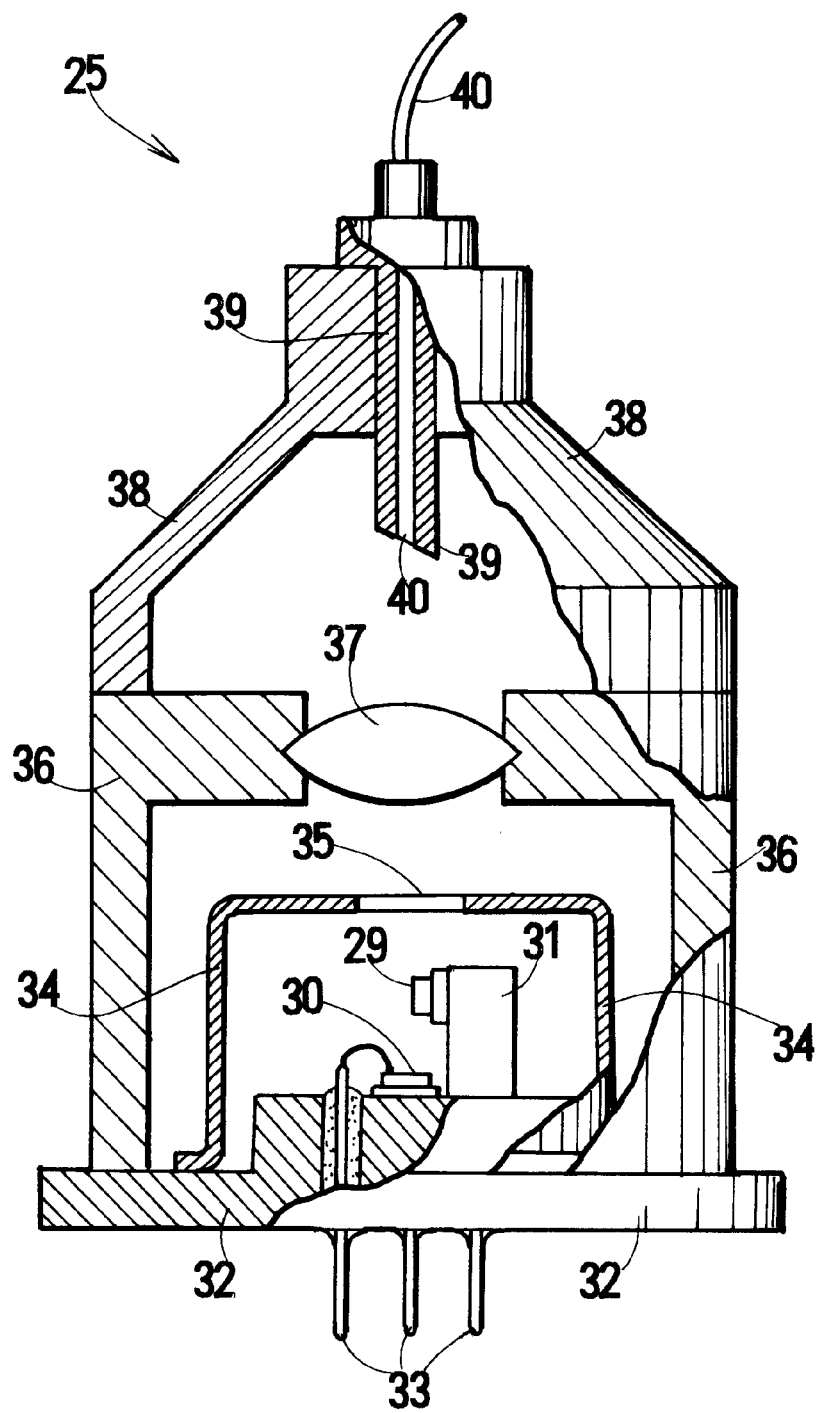
FIG. 5 is a vertically-sectioned view of a conventional LD module.
Figure 6:
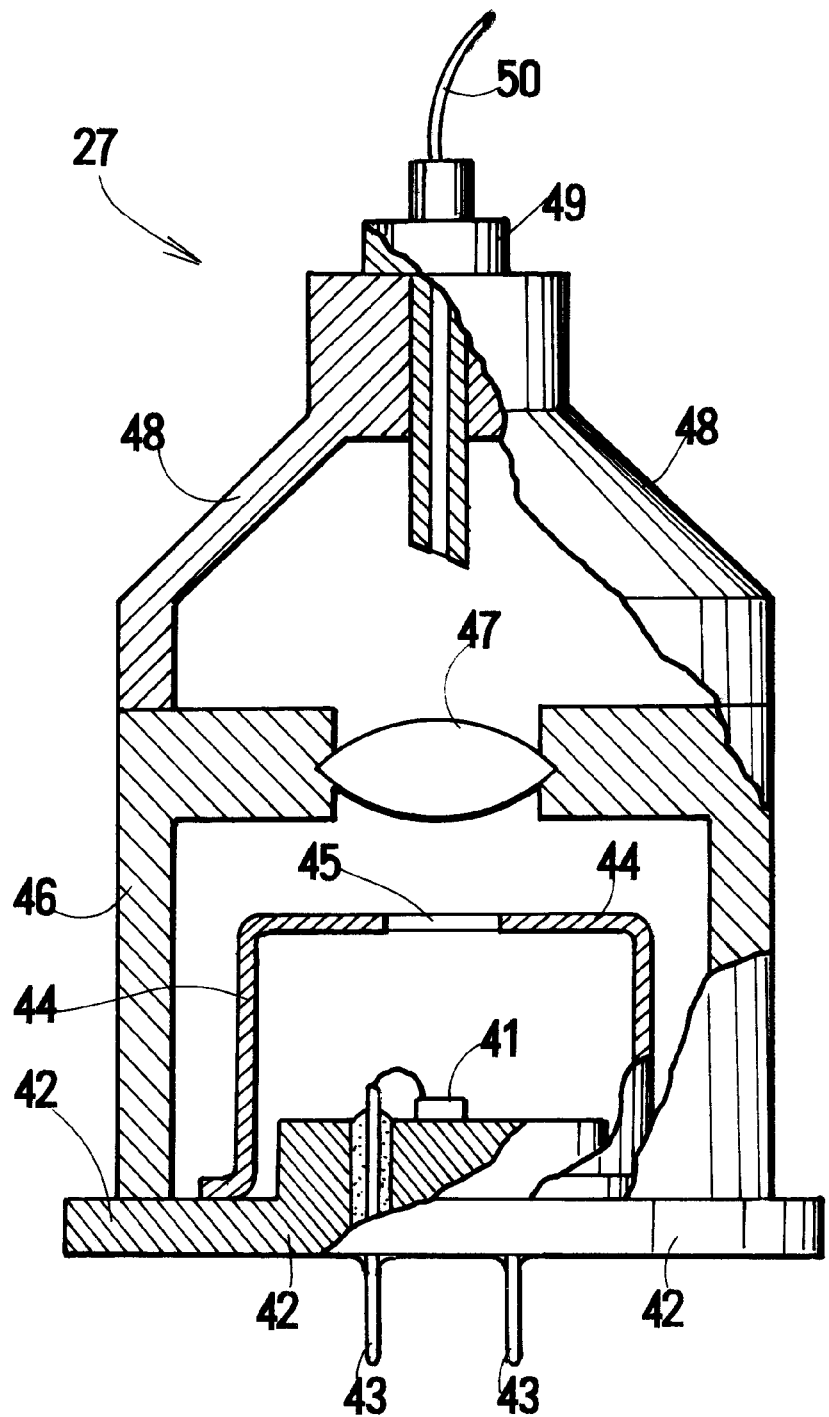
FIG. 6 is a vertically-sectioned view of a conventional PD module.
Figure 7:
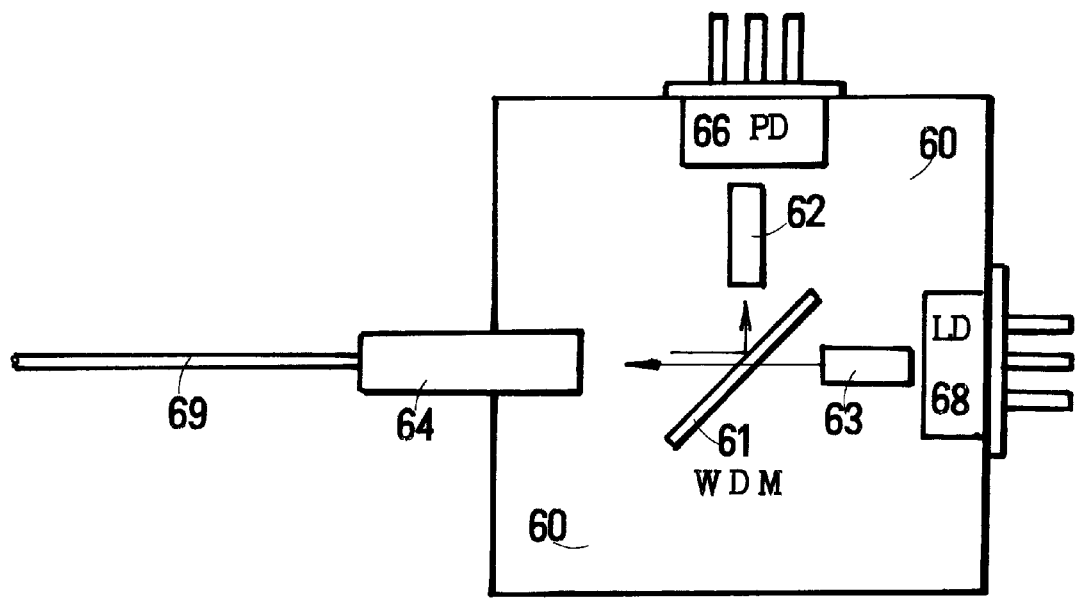
FIG. 7 is a horizontally-sectioned view of a prior receptacle-type multiwavelength LD/PD module.

The receiving signal light from the optical connector enters the light guide 114, and is reflected upward from the filter 117. The reflected light enters the PD 115 and is converted to a photocurrent. The filter 117 has the function of passing 100% of the transmitting signal light from the LD and reflecting 100% of the receiving signal light. Since the LD/PD module is a transmitting/receiving apparatus, the filter plays the important role of separating the transmitting signal light from the receiving signal light. The wavelength of the transmitting light differs from that of the receiving light, which enables the filter to separate two kinds of light, e.g., transmitting light and receiving light. The simultaneous bidirectional transmission requires such a wavelength-selective filter. Namely, the filter should be a WDM filter having wavelength selectivity. For example, as shown in FIG. 4, the transmitting light has a wavelength of 1.3 $\mu$m and the receiving light has a wavelength of 1.55 $\mu$m. 1.3 $\mu$m receiving light and 1.55 $\mu$m transmitting light are also allowable, but the filter requires a different multi-layer structure.

The monitoring PD keeps watching the light power of the LD for transmitting light, and maintains an even output of the light. The backward light from the LD must enter a sensitive region of the PD. Some contrivance is necessary when the surface of the PD is in parallel to the (110) plane of the substrate. The composition for leading the monitoring light to the PD will be explained by FIG. 15 and FIG. 16.

Figure 15:
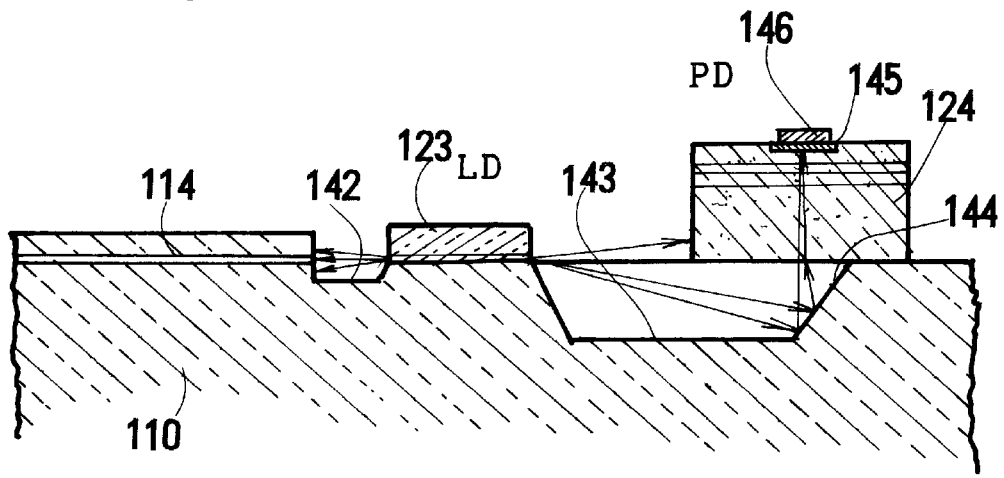
FIG. 15 is a zx-sectional view of the PD for monitoring the light power and the LD including a light emitting part (strip) formed downside and fixed on the platform of the LD/PD module related to the mode 1 of the present invention.

FIG. 15 shows an example of the structure where a strip region (light emitting region) is formed in the down side of the LD 123, and the LD 123 is fixed on the platform. The rear surface incidence-type PD 124 is at the back of the LD 123, and the light receiving region is positioned at the center of the upper surface of the chip. A concave-groove 143 is dug between the LD 123 and PD 124. The methods of producing the concave-groove 143 are varied by materials of the substrate. When the substrate is a Si-substrate, the concave-groove 143 is produced by the anisotropic etching of Si (001) crystal, as well as the V-groove of the guide pin. The concave-groove 143 has an oblique angle of 54.7 degrees. The bottom surface of the PD is just fixed on the concave-groove 143. Since a horizontal width of the PD 124 is wider than a width of the concave-groove 143, there is no problem to the fixation of PD 124. The concave-groove 143 has a slanting end surface 144. When the concave-groove 143 is made by Si-etching, an angle of the slanting end surface is 54.7 degrees.

The light going out of the front of the LD 123 enters the light guide (optical waveguide) 114. The light going out of the back of the LD 123 shoots to the slanting end surface 144, is reflected by the end surface 144, goes to the bottom surface of the PD 124, passes through the PD 124, and reaches the upward sensitive region 145. The photocurrent generated in the sensitive region 145 is taken out from the electrode 146. The light from the LD is once reflected, turns direction, and gets into the PD bottom surface.

Figure 16:
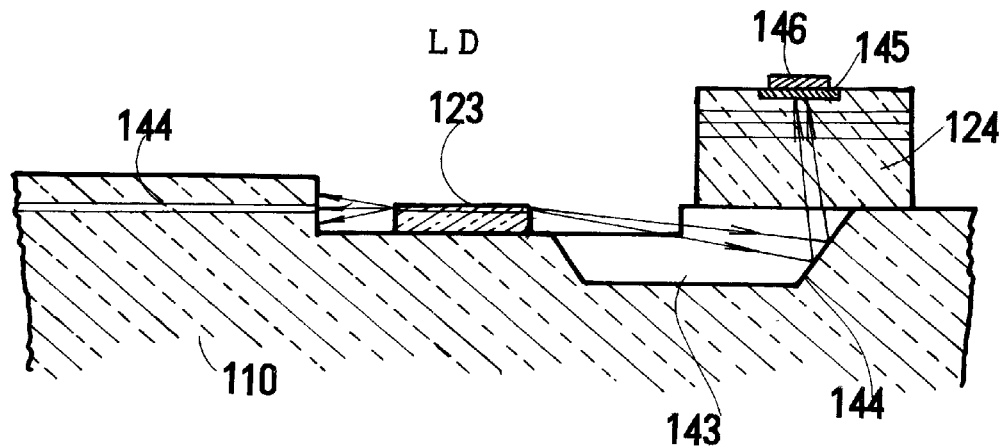
FIG. 16 is a zx-sectional view of the PD for monitoring the light power and the LD including a light emitting part (strip) formed upside and fixed on the platform of the LD/PD module related to the mode 1 of the present invention.

The LD shown in FIG. 16 has a strip region (light emitting region) formed upward. Since the height of light emitted from the LD is changed, the height of the LD positioned on the platform must be a little arranged. The forward light from the LD enters the light guide 114 as it is. The backward light from the LD is reflected from the slanting end surface 144, and enters the PD 124.

Since the PD 124 is fixed in parallel on the substrate surface 110, the backward light from the LD must be reflected by the concave-groove 143 and the slanting end surface 144. If the PD is vertically fixed on the platform as the sensitive region 145 faces to the strip region of the LD, the concave-groove 143 is unnecessary. In this case, it is better to stand a pole (not shown) vertically on the platform 110 and put an upper surface incident-type PD on the side surface of the pole opposite to the LD.

The LD/PD module of the present invention can be utilized not only for the simultaneous bidirectional optical communication but also for the alternate bidirectional optical communication, e.g., alternate transmission, ping-pong transmission. In the alternate bidirectional transmission, two kinds of light with different wavelengths are not needed, because there exists time difference. When both transmitting light and receiving light have the same wavelength of $\lambda$, the transmitting and the receiving are alternately repeated at different time. For example, the 1.3 $\mu$m light is sent, and the 1.3 $\mu$m light is received. In this case, the filter 117 penetrates the 1.3 $\mu$m light and reflects the 1.3 $\mu$m light at a constant rate. For instance, the alternate bidirectional transmission gives the filter 117 the function just like a beam splitter capable of separating the incident light at an incident angle of $\theta$ according to the rates of penetration to reflection, for example, 1:1.

Figure 17:
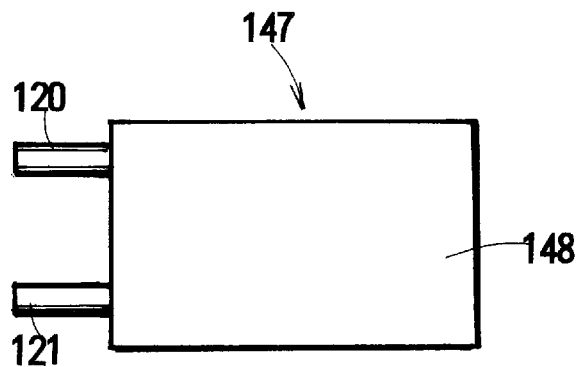
FIG. 17 is a plan view of the LD/PD module sealed in a package, which is related to the mode 1 of the present invention.
Figure 18:
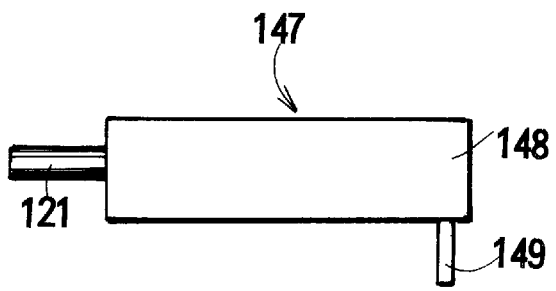
FIG. 18 is a front view of the LD/PD module sealed in a package which is related to the mode 1 of the present invention.

The metallized patterns shown in FIG. 10 are connected to pins of a lead frame (that is not shown), respectively by wirebonding. Then, the platform is packaged in a case. FIG. 17 and FIG. 18 show the states of accommodating the platform in the case. Various packages are available, for example, a ceramic package, a plastic-mold package and so on. In this case, a cheap plastic package is shown. The platform installed in the lead frame is mounted into the plastic mold package, and is fixed by injecting liquid-type resin. Only the end of the lead frame and ends of the guide pins jut out from the plastic case.

Hence, the LD/PD module of the present invention has a plastic package 148 for covering and sustaining the platform, a part of the lead frame and parts of the guide pins. Two guide pins 120 and 121 project forth from the forward surface of the module 147. These guide pins 120 and 121 are inserted into holes of the optical connector. A plurality of vertical lead pins 149 jut out from the backward bottom surface of the module. The lead pins 149 have a suitable arrangement. Here, a plurality of lead pins are arranged at equal distances. DIP-type is also preferable. The lead frame, which is connected to the inside electrode patterns, has terminals for giving driving electric power and light transmitting signals to the LD, the PD, the monitor and so on or taking out receiving light signals, LD power signals and so on.

The functions of the LD/PD module of the present invention is explained. The optical connector and the module are unified by plugging the guide pins in the holes of the optical connector. The fiber of the optical connector just faces to the optical guide 114. The light propagating in the fiber from the broadcasting station passes through the light guide 114 and is reflected from the filter 117. The reflected light enters the PD 115 and the transmitting signals are received.

The transmitting light generated in the LD 123 penetrates the filter 117, goes out of the optical guide 114, and enters the optical fiber. Since the LD/PD module of the present invention never attaches an optical fiber, it succeeds in excluding the optical fiber tail trailing along the module. The module and the optical fiber is unified by inserting the guide pins into the optical connector.

Figure 19:
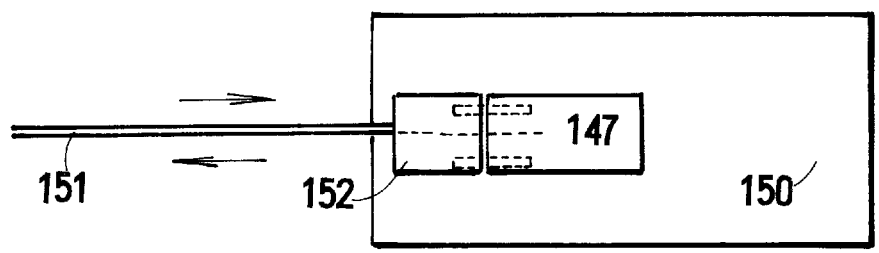
FIG. 19 is a plan view of the state where the LD/PD module is mounted on the substrate and the MT connector connects to the module, which is related to the mode 1 of the present invention.

FIG. 19 shows the LD/PD module installed on a printed circuit board for signal processing and coupled with an optical connector. The printed circuit board 150 includes electric circuits for converting signals to be sent into a form congruous to transmitting, for amplifying received signals and for reproducing signals. Besides the circuits, the printed circuit board 150 has the LD/PD module 147 of the present invention soldered thereon. An optical connector 152 is, for example, an MT (miniature) connector or a mini-MT(mini-miniature) connector. The optical connector 152 has a pair of holes corresponding to the guide pins 120 and 121 of the module 147. The end (which is shown with dotted line) of the optical fiber 151 is exactly interposed at the middle point between the holes in the connector. The insertion of the guide pins 120 and 121 into the holes of the optical connector 152 makes the optical fiber 151 face to face with the light guide 114. The 1.55 $\mu$m signal light transmitted from the central station transfers to the light guide 114, is reflected from the filter 117, and enters the PD in which the photocurrent converted from the light power is detected.

The transmitting signal light emitted from the LD 123 enters the light guide 114, transfers into the optical fiber 151, propagates in the fiber 151, and arrives at the broadcasting station. The LD/PD module of the present invention has no optical fiber in itself, but it can be easily attached to or removed from the optical connector.

Figure 20:
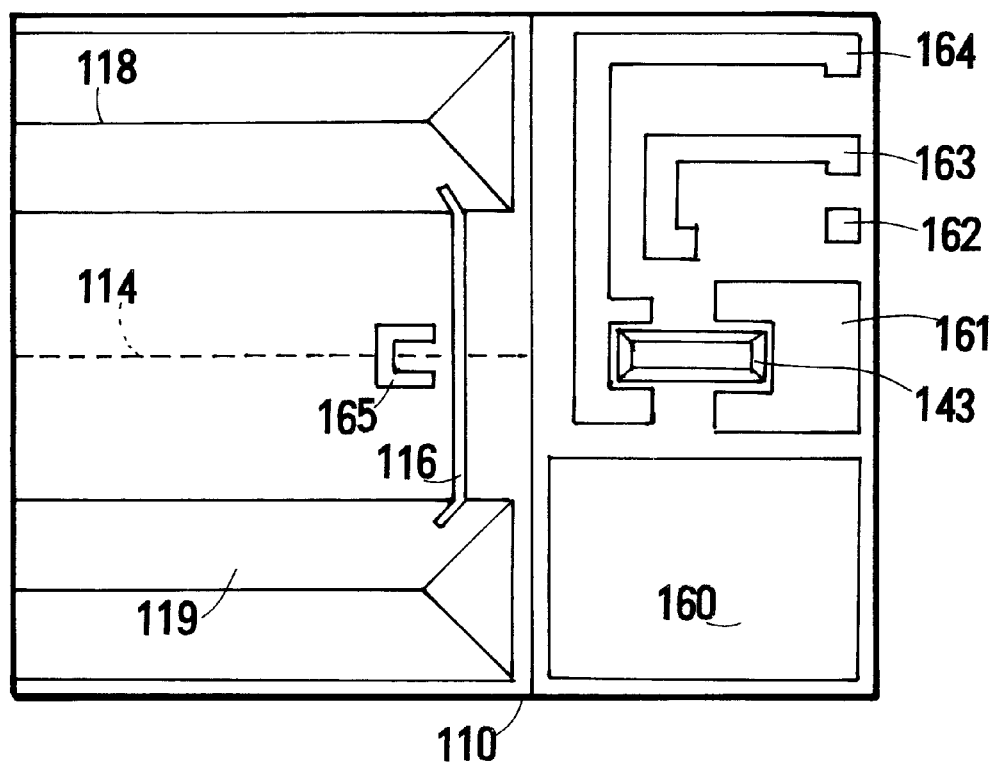
FIG. 20 is a plan view of the platform of the LD/PD module having another metallized patterns, which is related to the mode 1 of the present invention.

FIG. 20 shows an example of the platform having another disposition of metallized patterns thereon. Digging V-grooves 118 and 119 and fixing the guide pins 120 and 121 to the V-grooves are the same as the platform shown by FIG. 10. A shallow optical guide 114 is formed in longitudinal central direction on the platform. A slanting groove 116 is formed on the way to the optical guide 114. Here, a WDM filter is slantingly inserted. Metallized patterns 160 to 165 are formed by printing on the substrate 110. The metallized pattern 164 for fitting the LD is positioned immediately behind the end of the optical guide 114. The metallized pattern 161 for fabricating the PD is positioned behind the metallized pattern 164. The metallized pattern 160 becomes a ground surface for the AMP. There is a concave-groove 143 between the LD and the PD, which can introduce the light emitted from the rear end of the LD to the PD. Only the metallized wiring patterns of FIG. 20 differs from that of FIG. 10. The metallized wirings can be freely designed.

[Practical Mode 2: (Pig-tail Type) (A)]

In the above-explained receptacle-type (B), the alignment is very important in the relation between the optical fiber of the connector and the light guide of the LD/PD module. The guide pins provide an accurate positioning between the module and the optical connector.

Figure 21:
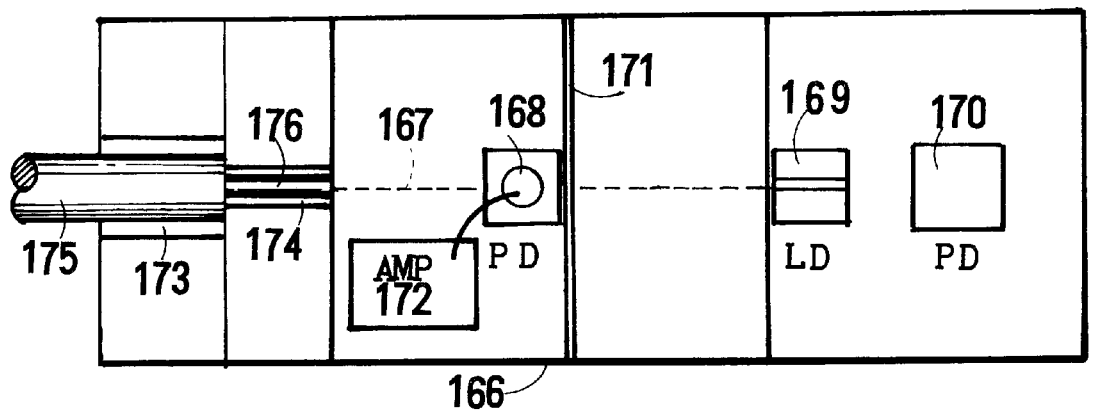
FIG. 21 is a plan view of the arrangement of devices formed on the platform of the LD/PD module related to the mode 2 of the present invention.

A-type (pig-tail-type) module will be explained. In the pig-tail type, the module and the optical connector possess no direct attachment, because an end of the optical fiber is connected to the module. A pig-tail type LD/PD module is explained by referring to FIGS. 21 to 25. FIG. 21 shows a disposition of device chips and an optical fiber being on a platform.

An oblong Si substrate (platform) 166 has a slightly high part at the center. The both sides of the platform are a little low. An optical waveguide 167 is formed on the higher middle part in longitudinal direction. This structure is similar to that of FIG. 10. Metallized patterns formed on the substrate surface are not shown therein.

Semiconductor chips are fixed on the metallized patterns. A PD 168 for receiving light is mounted on the light guide 167 running through the center part. An LD 169 for transmitting light is fixed on the lower surface of the substrate, as being close to the end of the light guide 167. Hence, the light guide 167 is arranged so the light emitted from the LD 169 can enter the light guide 167. A monitoring PD 170 is fixed behind the LD 169. The PD 170 monitors the light power from the LD 169.

A filter 171 slanting upward is fitted just behind the PD 168, as going across the light guide 167. An AMP 172 is bonded on a horizontal side of the platform. The AMP 172 fixed beside the PD 168 amplifies the photocurrent from the PD. The platform 166 is disposed on a lead frame (that is not shown). Each lead frame connects to the electrode patterns of the PD, LD and so on by wires.

There are a deep V-groove 173 and a shallow V-groove 174 dug in a step part formed in front of the platform 166. A core 176 of the optical fiber 175 (diameter of clad: 125 $\mu$m) is fixed in the shallow V-groove 174 by an adhesive, and a coating part (diameter: 900 $\mu$m) is fixed in the deep V-groove 173 by the adhesive.

Figure 22:
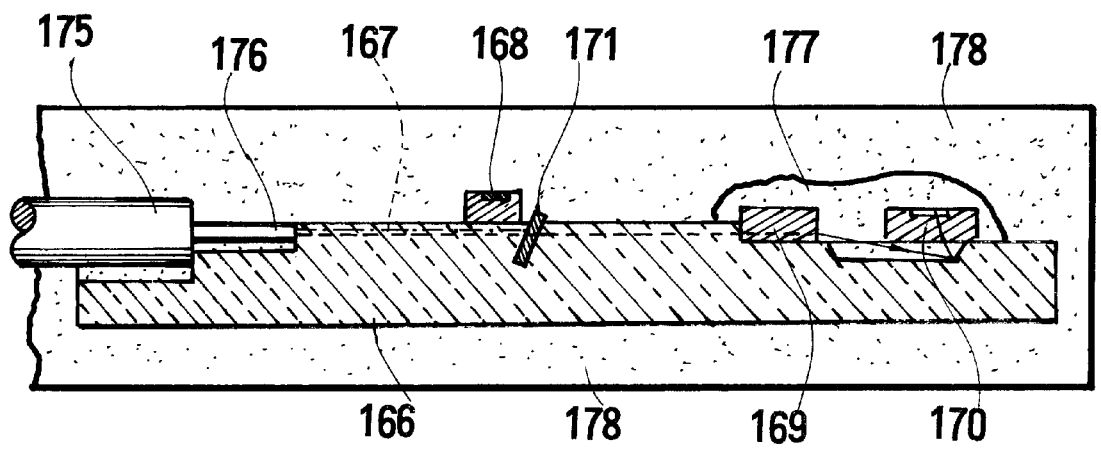
FIG. 22 is a longitudinal sectional view of the plastic-molded platform of the LD/PD module related to the mode 2 of the present invention.

A transparent resin 177 drips in an interval between the LD 169 and PD 170. This transparent resin 177 is necessary for leading the backward light from the LD to the PD, for example, a silicon-type adhesive is used. A free space between the filter 171 and PD 168 is also filled with the transparent adhesive. This example adopts a cheap plastic package. The lead frame and the platform 166 are molded and are hardened by pouring the adhesives 178. The adhesives 178 for hardening has the function of connecting the platform, the lead frame and the optical fiber, reciprocally, and further becomes a package. FIG. 22 is a sectional view of the molded state. The adhesive 178 for hardening is, for example, epoxy-type resin.

The transmitting signal light from the optical fiber enters the optical waveguide 167, is reflected from the filter 171, and gets into the PD 168. The receiving signal light is converted to a photocurrent, and the photocurrent is pre-amplified by the AMP 172. The transmitting signal light getting out of the LD 169 enters the optical waveguide 167, goes straight on, and enters the optical fiber 175. The movement is the same as the practical mode 1.

Figure 23:
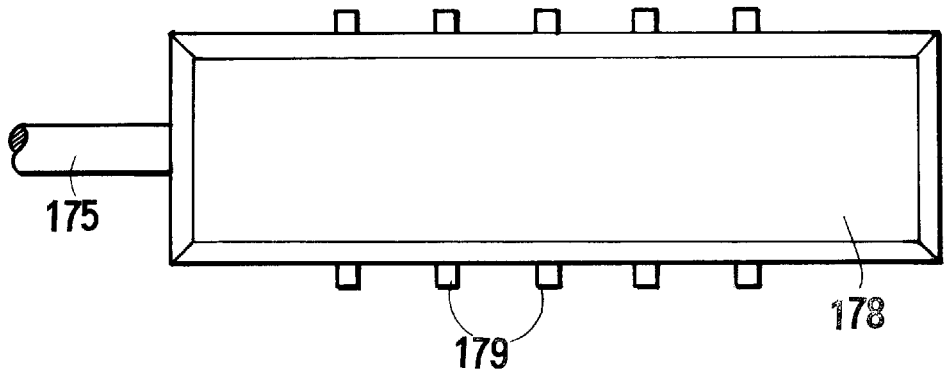
FIG. 23 is a plan view of the LD/PD module sealed in a package, which is related to the mode 2 of the present invention.
Figure 24:
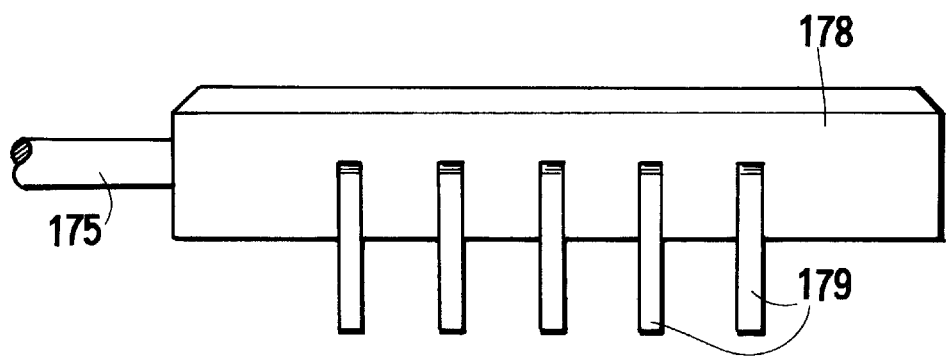
FIG. 24 is a front view of the LD/PD module sealed in a package, which is related to the mode 2 of the present invention.
Figure 25:
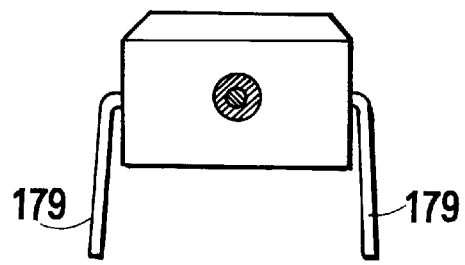
FIG. 25 is a left side view of the LD/PD module sealed in a package, which is related to the mode 2 of the present invention.

FIG. 23 to FIG. 25 show the appearances of the package of the mode 2. This is a DIP-type that lead pins protrude to the both sides of the plastic package 178 in equal distances. The front end of the package is fitted up with an end of the optical fiber. The end of the optical fiber connects to the optical connector. The optical connector attaches to or removes from other optical fibers. There is no alignment between the optical waveguide and the optical fiber, which differs from the mode 1. Non-alignment requires no guide pins.

Figure 26:
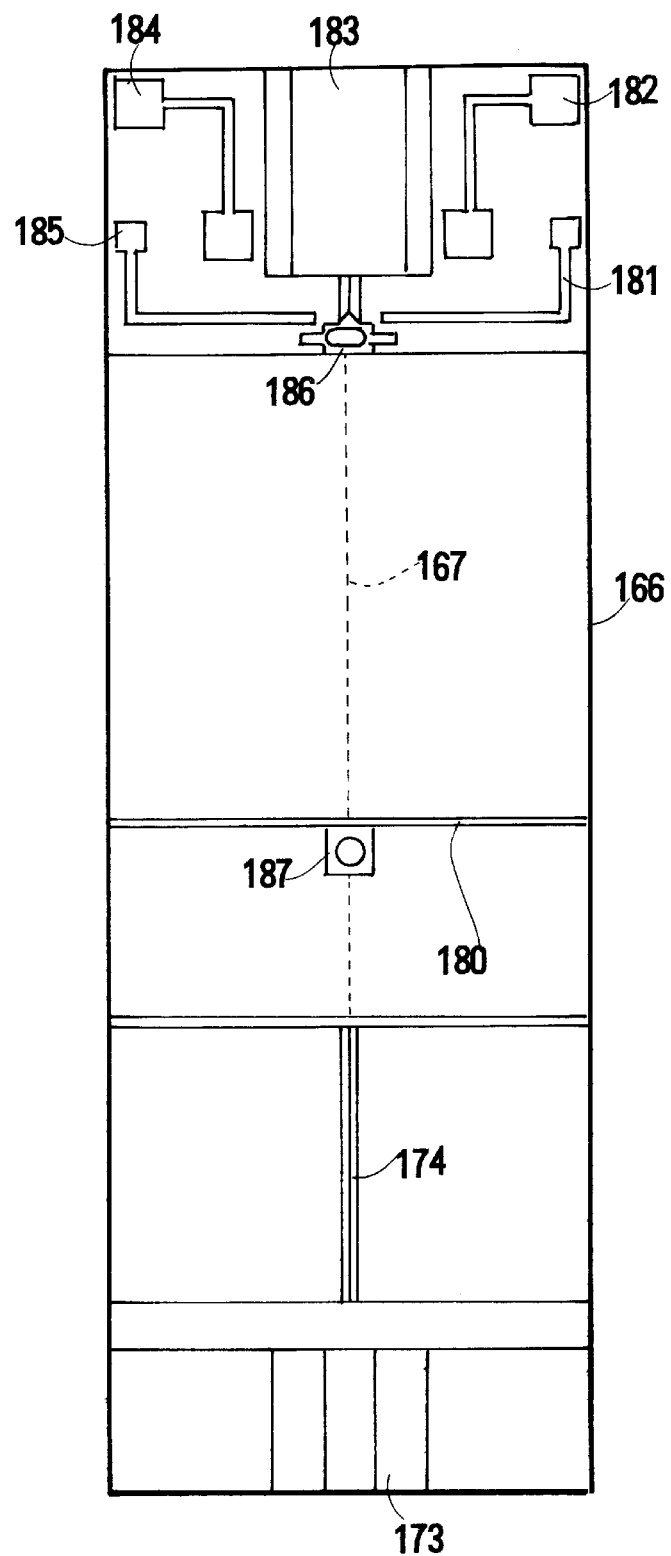
FIG. 26 is a plan view of the platform including another metallized patterns of the LD/PD module related to the mode 2 of the present invention.

FIG. 26 is a plan view of the metallized patterns of the platform 166 of the device shown in FIG. 21 to FIG. 25. There is no difference in the structures of the V-grooves 173 and 174 for fixing the optical fiber. A shallow, longitudinal optical waveguide 167 is formed at the center of the platform. A slanting filter groove 180 is dug upward. A metallized pattern 187 for the PD is formed just before the filter groove 180. A metallized pattern 186 for the LD and a metallized pattern 183 for the monitoring PD are formed on the rear of the platform. Metallized patterns 181, 182, 184 and 185 are connected to upper electrode pads for the LD and the PD.

[Optical Path for Leading the Filter Reflected Light to the PD from the Rear Surface]

Figure 9:
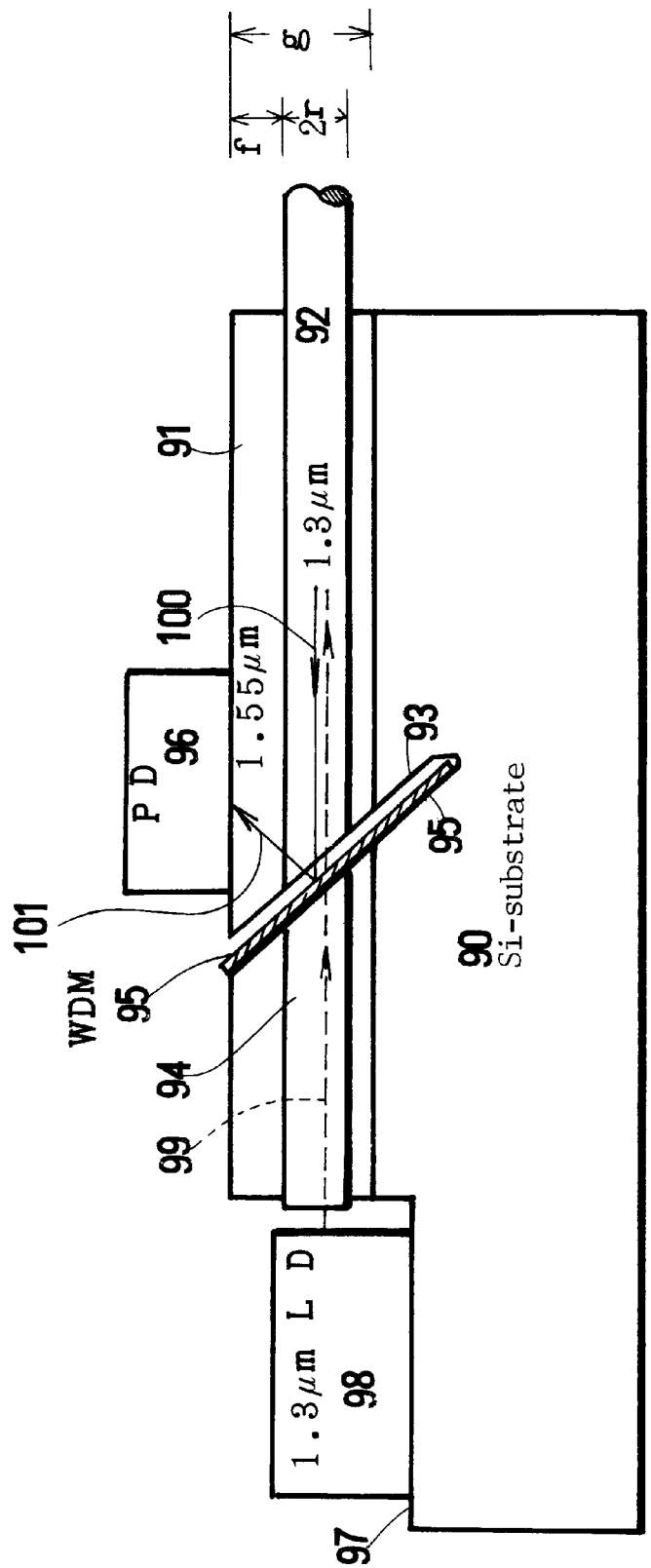
FIG. 9 is a sectional view of a prior LD/PD module including an upward slanting WDM which reflects incoming light upward.

The differences between the prior module and the module of the present invention are explained by referring to FIG. 9 showing the prior module. In the prior module, the receiving light is reflected upward from the filter, and enters the PD from the rear surface. This is common. The prior module has the V-groove capable of burying the optical fiber with a diameter of 125 μm. The 125 μm diameter is so large that the V-groove must be wide and deep. The bottom angle of the V-groove is defined to be 2 φ. When the V-groove with a (±1±1 1) plane is formed on the (001) plane substrate, 2φ=70.6 degrees. The radius of the optical fiber (cladding) is denoted by r, for example 2r=125 μm. The difference between the upper surface of the fiber and the substrate surface, that is, a burying depth, is expressed with f. Then the depth g of the V-groove is shown by the following equation (1).

$$g = r(1 + \csc \phi) + f \quad (1)$$

The width (w) of the V-groove is given by $$w = 2r(\tan \phi + \sec \phi) + 2f \tan \phi \quad (2)$$

The depth (e) from the surface to the optical path is given by $$e = r + f \quad (3)$$

For example, when φ=35°, r=62.5 μm and f=60 μm, g=170 μm, w=320 μm and e=122.5 μm. The PD requires a width of more than w, because the PD extends over the V-groove. A margin for the PD requires a larger size of the PD. It is difficult to fit the PD, which is a first problem. There is another problem. Since the optical path from the filter to the PD is long, the receiving light reflected from the filter is extended. The extension of the reflected light decreases the light power capable of reaching the sensitive region of the PD.

Figure 27:
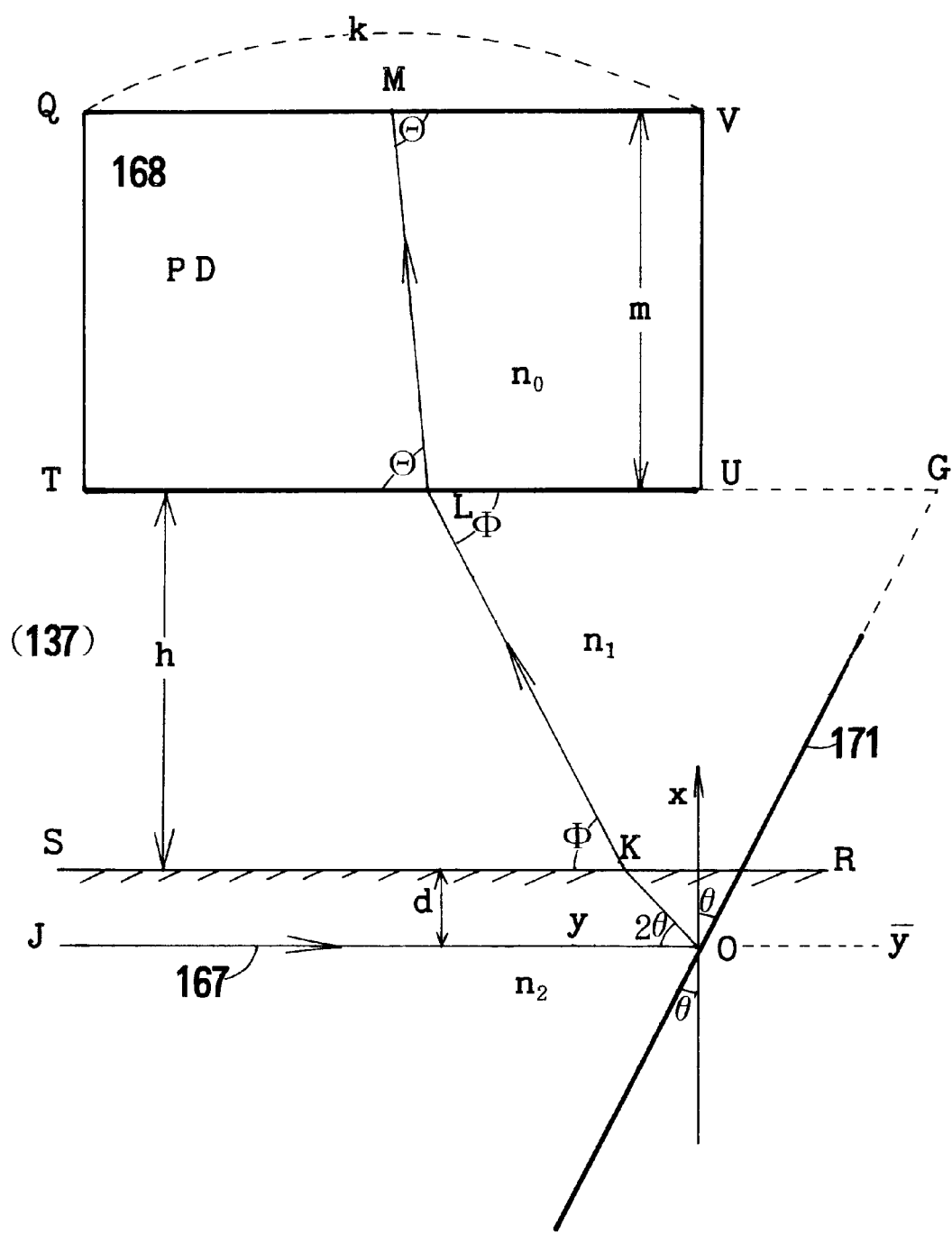
FIG. 27 is a linear figure for explaining the optical path of the receiving light that shoots the slanting filter, turns upward, passes through the spacer, enters the bottom surface of the PD, and reaches the receiving region of the PD.

In FIG. 27, the receiving light is reflected from the filter, passes through the space, reaches the rear surface of the PD, and goes to the sensitive region of the PD. The refractive index of the light guide is $n_2$, the refractive index of the space is $n_1$, and the refractive index of the PD is $n_0$, The space is formed by the spacer, and is filled with a transparent adhesive. The refractive index of the adhesive is set up to be equal to the waveguide refractive index, be equal to the PD refractive index or be middle between the PD refractive index and the waveguide refractive index.

The longitudinal horizontal direction of the light guide is assigned to y-axis, and the vertical direction is assigned to x-axis. The origin O is a point of intersection of filter 171 and the light guide. The positive direction of y is the direction of transmitting signal light. The receiving signal light JO propagates in negative direction and is slantingly reflected from the filter. The reflected light gets in the space (a concave-groove of the spacer: the adhesive) passing through point K, and enters the rear surface of the PD passing through point L. Here, the distance from the light guide to the platform surface, the distance from the platform surface to the bottom surface of the PD, the height of the PD, and the length of the PD are assigned to be d, h, m and k, respectively. The oblique angle of the filter 171 to the plumb line (x-axis) is expressed by θ.

The point G is a point of intersection of an extension of the bottom surface TU of the PD and an extension of the filter. VQ is an upper surface of the PD 168. This PD is a rear surface incident type and forms a light receiving region M at the center of the upper surface VQ. There is an electrode (which is not shown in FIG. 27) on the light receiving region. If the filter 171 were wide, the PD 168 might touch with the filter. Therefore, the length of the GU should be designed to be positive. Even if the GU were negative, however, the collision of the filter and the PD is evaded by making the filter width narrower, i.e., lower than the spacer height h.

The receiving signal light JO is expressed by x=0. The light OK reflected from the filter at the origin O makes an angle of 2θ to the x-axis. The point K is (d, d cot 2θ). The light refracted at the point K becomes an optical line having an angle of Φ to the surface. The angle Θ is an angle between the light entering to the PD at the point L and the bottom surface. Vectors KL and LM are KL(h, h cot Φ) and LM(m, m cot Θ), respectively. Snell's law is established among the angles, θ, Φ, and Θ, which goes as follows, $$n_2 \cos 2\theta = n_1 \cos \Phi = n_0 \cos \Theta \quad (4)$$

Since $n_0$, $n_1$, $n_2$ and θ are predetermined, Φ and Θ are fixed. The coordinates of the points K, L and M are given as follows.

$$K = (d, d \cot 2\theta) \quad (5)$$

$$L = (d+h, d \cot 2\theta + h \cot \Phi) \quad (6)$$

$$M = (d+h+m, d \cot 2\theta + h \cot \Phi + m \cot \Theta) \quad (7)$$

Point G is denoted by the following equation.

$$G = (d+h, -(d+h) \tan \theta) \quad (8)$$

The length of the PD chip 168 is assigned to be k, as mentioned above. This is the most suitable incident condition that the middle point of the chip top-surface is point M that is the last attaining point of the beams of the receiving light. Then, the coordinates of the point U are;

$$U = (d+h, d \cot 2\theta + h \cot \Phi + m \cot \Theta - (k/2)) \quad (9)$$

As comparing the y-coordinate of point G with the y-coordinate of point U;

$$UG = d \cot 2\theta + h \cot \Phi + m \cot \Theta - (k/2) + (d+h) \tan \theta > 0 \quad (10)$$

When the inequality (10) is established, the filter does not touch the PD chip even if the filter is so wide. The condition for satisfying positive UG gives the lower limit of the height h of the spacer 137.

$$(k/2) - m \cot \Theta - d(\cot 2\theta + \tan \theta) < h(\cot \Phi + \tan \theta) \quad (11)$$

The distance E of optical path passing through the points O, K and L is shown as follows;

$$E = n_2 d \csc 2\theta + n_1 h \csc \Phi + n_0 m \csc \Theta \quad (12)$$

When the oblique angle θ, the refractive indexes $n_1$, $n_2$ and $n_0$, the chip thickness m and the chip length k are common to the LD/PD module shown in FIG. 9, different things are only the height h of the spacer and the depth d of the optical path. The optical waveguide of the present invention has a depth ranging from about 5 µm to about 40 µm, in particular from 5 µm to 20 µm. The depth of the module of FIG. 9 is, however, more than 120 µm, e.g., d=120 µm. Therefore, there appears a large difference in the first term of E. Since the optical path E of the module of FIG. 9 is too long, the receiving signal light spreads over and thereby the light power entering the light receiving region of the PD is decreased. The first term of E is so small in the present invention that there occurs no extension of the light beams. Hence, the light receiving region accepts a great deal of light power, and the sensitivity is increased.

What We claim is:

1. A light transmitting/receiving module comprising:

a planar platform having a top surface, a bottom surface, sides, a front end and a rear end;

a straight light guide formed on the top surface of the platform in a direct line starting from the front end for guiding transmitting light and receiving light with an end appearing at the front end of the platform;

a photodetector (PD or APD) mounted just above the light guide for detecting power of receiving light;

a slanting groove formed close to the photodetector (PD or APD) on the way of the light guide on the substrate;

a filter being inserted into the slanting groove and sloping upward for reflecting receiving light, introducing the reflected light to the photodetector (PD or APD) and penetrating transmitting light;

a light source (LD or LED) being positioned at an extension of the light guide on the platform for introducing transmitting light to the light guide;

V-grooves formed on the top surface from the front end of the platform; and guide pins fixed in the V-grooves for temporarily connecting to an optical connector having a front end, an optical fiber appearing at the front end, and holes perforated at the front end by inserting the guide pins of the module into the holes of the optical connector and positioning the fiber end opposite to the light guide end and for temporarily separating the optical connector by extracting the guide pins from the holes of the connector.

2. A light transmitting/receiving module as claimed in claim 1, wherein the guide pin has a pitch capable of being coupled with an MT connector or a mini MT connector.

3. A light transmitting/receiving module as claimed in claim 1, wherein the light source is a semiconductor laser, and a monitoring photodiode is positioned behind of the semiconductor laser and monitors the reflected light from a sloping surface formed at an end of a concave-groove dug between the semiconductor laser and the monitoring photodiode.

4. A light transmitting/receiving module as claimed in claim 1, wherein the filter is positioned upward at an angle of nearly 30 degrees to the light guide.

5. A light transmitting/receiving module as claimed in claim 1, wherein the module is used for simultaneous bidirectional transmission by using transmitting light ($\lambda_1$) and receiving light ($\lambda_2$) which have different wavelengths, and the filter is a wavelength-selective filter capable of reflecting the receiving light ($\lambda_2$) and penetrating the transmitting light ($\lambda_1$).

6. A light transmitting/receiving module as claimed in claim 1, wherein the module uses transmitting light and receiving light which are the same wavelength ($\lambda$), and the filter is a beam splitter capable of reflecting a part of the receiving light and penetrating a part of the transmitting light.

7. A light transmitting/receiving module as claimed in claim 1, wherein the light guide is made from quartz glass ($SiO_2$).

8. A light transmitting/receiving module as claimed in claim 1, wherein the light guide is made from a transparent polymer material.

9. A light transmitting/receiving module as claimed in claim 1, wherein the filter is made by piling optical multi-layers on a polymer layer.

10. A light transmitting/receiving module as claimed in claim 1, wherein the filter is made by piling optical multi-layers on a transparent glass substrate.

11. A light transmitting/receiving module as claimed in claim 1, wherein the photodetector is a Si-photodiode, and the light source is a GaAlAs semiconductor laser.

12. A light transmitting/receiving module as claimed in claim 1, wherein the photodetector is an InGaAs-type or an InGaAsP-type photodiode, and the light source is an InGaAsP semiconductor laser.

13. A light transmitting/receiving module as claimed in claim 1, wherein the photodetector is a photodiode having a rear incident surface for introducing the receiving light.

14. A light transmitting/receiving module as claimed in claim 1, wherein an amplifier for amplifying photodetector signals is positioned near the photodetector for receiving signals.

* * * * *